United States Patent [19]

Yoneda et al.

[11] Patent Number: 4,536,842

[45] Date of Patent: Aug. 20, 1985

[54] SYSTEM FOR MEASURING INTERFLOOR TRAFFIC FOR GROUP CONTROL OF ELEVATOR CARS

[75] Inventors: Kiyoshi Yoneda; Hiroshi Takeuchi, both of Tokyo; Tetsuo Yamatani, Yokkaichi; Toyoto Hijiya, Yokosuka; Hideo Takeda, Inagi; Koji Shibuya, Ashiya; Kiichiro Tanaka, Tokyo, all of Japan

[73] Assignee: Tokyo Shibaura Denki Kabushiki Kaisha, Kawasaki, Japan

[21] Appl. No.: 479,899

[22] Filed: Mar. 29, 1983

[30] Foreign Application Priority Data

| | | | |
|---|---|---|---|
| Mar. 31, 1982 | [JP] | Japan | 57-53469 |
| Mar. 31, 1982 | [JP] | Japan | 57-53471 |
| Jun. 25, 1982 | [JP] | Japan | 57-109529 |

[51] Int. Cl.[3] .......................... G06F 15/46; B66B 1/18

[52] U.S. Cl. ................................ 364/424; 187/29 R; 364/164

[58] Field of Search ............... 364/140, 148, 164, 165, 364/167, 424; 187/29 R; 340/19 R, 21

[56] References Cited

U.S. PATENT DOCUMENTS

| | | | |
|---|---|---|---|
| 3,385,402 | 5/1968 | Burgy et al. | 187/29 |
| 3,593,825 | 7/1971 | Gieseler | 187/29 R |
| 3,746,131 | 7/1973 | Hirasawa et al. | 187/29 |
| 3,857,465 | 12/1974 | Iwasaka et al. | 187/29 R |
| 3,967,702 | 7/1976 | Iwasaka et al. | 187/29 |
| 3,973,649 | 8/1976 | Iwasaka et al. | 187/29 R |
| 3,999,631 | 12/1976 | Iwasaka et al. | 187/29 R |
| 4,039,049 | 8/1977 | Yoneda et al. | 187/29 R |
| 4,044,860 | 8/1977 | Kaneko et al. | 187/29 R |
| 4,064,971 | 12/1977 | Iwasaka et al. | 187/29 R |
| 4,246,983 | 1/1981 | Bril | 187/29 R |

*Primary Examiner*—Joseph Ruggiero
*Attorney, Agent, or Firm*—Oblon, Fisher, Spivak, McClelland & Maier

[57] ABSTRACT

An elevator passenger traffic measuring system distributes passengers whose destination floors cannot be determined to each of origin-destination floor pairs in accordance with an elevator car position, an incoming passenger number and an outgoing passenger number at each floor, and registered car calls, using probability weights for the origin-destination floor pairs which are determined by previous traffic measurements. The system then estimates the number of passengers for each of the origin-destination floor pairs in accordance with the distributed passengers, and the passengers who moved the corresponding one of the origin-destination floor pairs.

11 Claims, 56 Drawing Figures

FIG. 8
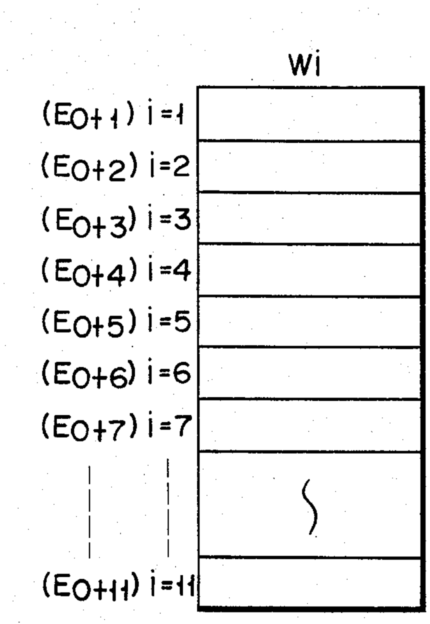
FIG. 9
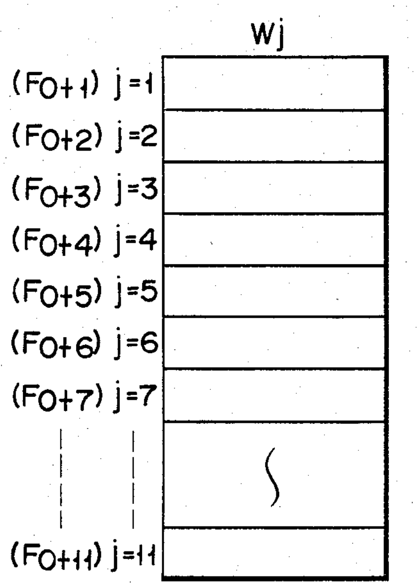
FIG. 10
| j → | 0 | 1 | 2 | 3 | 4 | 5 | 6 | 7 | 8 | 9 | 10 | 11 |
|---|---|---|---|---|---|---|---|---|---|---|---|---|
| (G0+1) i=1 | X | 0 | 0 | 1 | 0 | 0 | 0 | 0 | 0 | 0 | 0 | 0 |
| (G0+2) i=2 | X | 0 | 0 | 1 | 1 | 0 | 0 | 0 | 0 | 0 | 0 | 0 |
| (G0+3) i=3 | X | 0 | 0 | 0 | 1 | 1 | 1 | 0 | 0 | 0 | 0 | 0 |
| (G0+4) i=4 | X | 0 | 0 | 0 | 0 | 1 | 1 | 0 | 0 | 0 | 0 | 0 |
| (G0+5) i=5 | X | 0 | 0 | 0 | 0 | 0 | 1 | 0 | 0 | 0 | 0 | 0 |
| (G0+6) i=6 | X | 0 | 0 | 0 | 0 | 0 | 0 | 0 | 0 | 0 | 0 | 0 |
| (G0+11) i=11 | X | 0 | 0 | 0 | 0 | 0 | 0 | 0 | 0 | 0 | 0 | 0 |

FIG. 19a

| j \ i | 1 | 2 | 3 | 4 | 5 | 6 | $W_i$ |
|---|---|---|---|---|---|---|---|
| (1) | 0 | 0 | 2 | 0 | 0 | 0 | (2-2)→0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| $W_j$ | 0 | 0 | -2 | 0 | 0 | 0 | |

FIG. 19b

| j \ i | 1 | 2 | 3 | 4 | 5 | 6 | $W_i$ |
|---|---|---|---|---|---|---|---|
| 1 | 0 | 0 | 2 | 0 | 0 | 0 | 0 |
| (2) | 0 | 0 | 0 | 1 | 0 | 0 | (2-1)→1 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| $W_j$ | 0 | 0 | -2 | -1 | 0 | 0 | |

FIG. 19c

| j \ i | 1 | 2 | 3 | 4 | 5 | 6 | $W_i$ |
|---|---|---|---|---|---|---|---|
| 1 | 0 | 0 | 2 | 0 | 0 | 0 | 0 |
| 2 | 0 | 0 | 0 | 1 | 0 | 0 | 1 |
| (3) | 0 | 0 | 0 | 0 | 1 | 1 | (3-2)→1 |
| 4 | 0 | 0 | 0 | 0 | 0 | 0 | |
| 5 | 0 | 0 | 0 | 0 | 0 | 0 | |
| 6 | 0 | 0 | 0 | 0 | 0 | 0 | |
| $W_j$ | 0 | 0 | (-2+2) →0 | -1 | -1 | -1 | |

FIG. 19d

| j \ i | 1 | 2 | 3 | 4 | 5 | 6 | $W_i$ |
|---|---|---|---|---|---|---|---|
| 1 | 0 | 0 | 2 | 0 | 0 | 0 | 0 |
| 2 | 0 | 0 | 0 | 1 | 0 | 0 | 1 |
| 3 | 0 | 0 | 0 | 0 | 1 | 1 | 1 |
| (4) | 0 | 0 | 0 | 0 | 0 | 0 | 1 |
| 5 | 0 | 0 | 0 | 0 | 0 | 0 | 0 |
| 6 | 0 | 0 | 0 | 0 | 0 | 0 | 0 |
| $W_j$ | 0 | 0 | 0 | (−1+3) → 2 | −1 | −1 | |

FIG. 19e

| j \ i | 1 | 2 | 3 | 4 | 5 | 6 | $W_i$ |
|---|---|---|---|---|---|---|---|
| 1 | 0 | 0 | 2 | 0 | 0 | 0 | 0 |
| 2 | 0 | 0 | 0 | 1 | 0 | 0 | 1 |
| 3 | 0 | 0 | 0 | 0 | 1 | 1 | 1 |
| 4 | 0 | 0 | 0 | 0 | 0 | 0 | 1 |
| (5) | 0 | 0 | 0 | 0 | 0 | 0 | 0 |
| 6 | 0 | 0 | 0 | 0 | 0 | 0 | 0 |
| $W_j$ | 0 | 0 | 0 | 2 | (−1+1) → 0 | −1 | |

FIG. 19f

| j \ i | 1 | 2 | 3 | 4 | 5 | 6 | $W_i$ |
|---|---|---|---|---|---|---|---|
| 1 | 0 | 0 | 2 | 0 | 0 | 0 | 0 |
| 2 | 0 | 0 | 0 | 1 | 0 | 0 | 1 |
| 3 | 0 | 0 | 0 | 0 | 1 | 1 | 1 |
| 4 | 0 | 0 | 0 | 0 | 0 | 0 | 1 |
| 5 | 0 | 0 | 0 | 0 | 0 | 0 | 0 |
| (6) | 0 | 0 | 0 | 0 | 0 | 0 | 0 |
| $W_j$ | 0 | 0 | 0 | 2 | 0 | −1+2 → 1 | |

FIG. 20
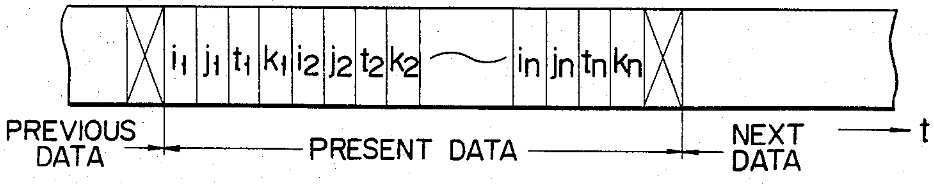
FIG. 21
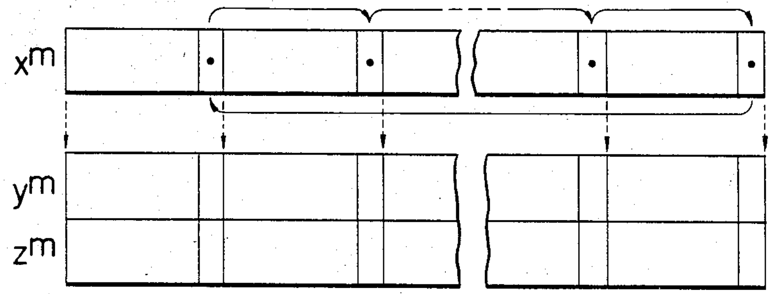
FIG. 22a
| j \ i | 1 | 2 | 3 | 4 | 5 |
|---|---|---|---|---|---|
| 1 | | 1 | 2 | 3 | 4 |
| 2 | 11 | | 5 | 6 | 7 |
| 3 | 12 | 13 | | 8 | 9 |
| 4 | 14 | 15 | 16 | | 10 |
| 5 | 17 | 18 | 19 | 20 | |
FIG. 22b
| j \ i | 1 | 2 | 3 | 4 | 5 |
|---|---|---|---|---|---|
| 1 | | 1 | 2 | 3 | 4 |
| 2 | 5 | | – | – | – |
| 3 | 6 | – | | 9 | – |
| 4 | 7 | – | – | | – |
| 5 | 8 | – | 10 | – | |
FIG. 22c
| j \ i | 1 | 2 | 3 |
|---|---|---|---|
| 1 | | 1 | 2 |
| 2 | 4 | | 3 |
| 3 | 5 | 6 | |

F I G. 37
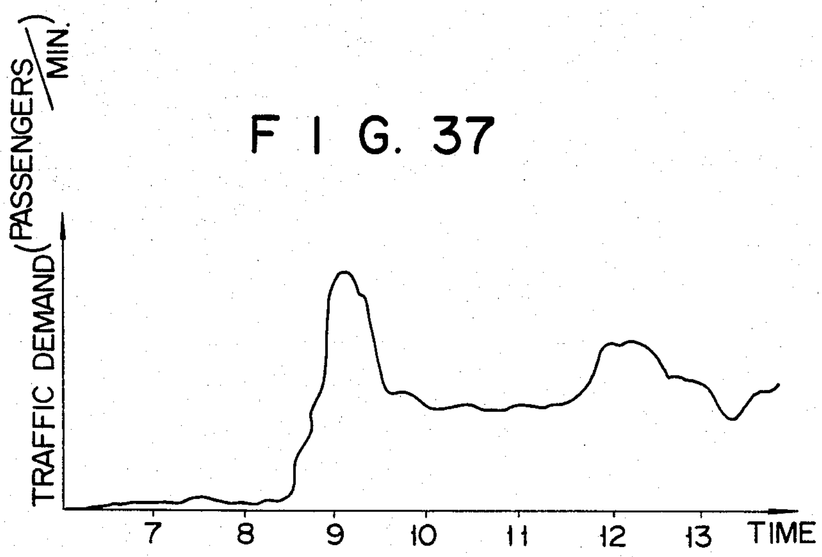
F I G. 38
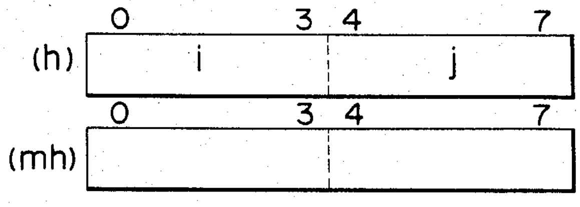
F I G. 39
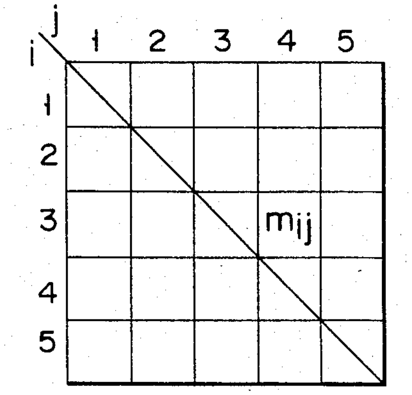
F I G. 40
| |
|---|
| y |
| $s_i$ |
| f |
| $t_0$ |
| $t_1$ |
| $t_k$ |
| d |

SYSTEM FOR MEASURING INTERFLOOR TRAFFIC FOR GROUP CONTROL OF ELEVATOR CARS

BACKGROUND OF THE INVENTION

The present invention relates to a system for automatically measuring, recording and predicting interfloor traffic for group control of elevator cars.

It is very important to accurately measure interfloor passenger traffic so as to provide basic research data for determining an operation system of the elevator cars in order to ensure effective utilization thereof. In group control of elevator cars, traffic demand for the elevator system has a certain degree of regularity in accordance with seasonal, daily, hourly and weather factors. By utilizing these factors, the elevator cars can be efficiently operated. If a day is divided into time periods to monitor the interfloor traffic in each time period of every day, a degree of regularity will be found which may be effectively utilized to effectively operate the elevator cars.

In a conventional elevator system, a researcher monitors floors at which a car stops, the number of incoming and outgoing passengers, and the time when the car stops, while he remains in the elevator car. However, it is very difficult to monitor the number of passengers with respect to each of origin (starting)- destination (stopping) floor pairs. Another type of conventional research has been conducted wherein research slips are handed to passengers at their origin floors and are collected at their destination or arrival floors so as to monitor the number of passengers with respect to each of origin-destination floor pairs. However, with this research method, a large number of researchers is required as well as the cooperation of the passengers. For this reason, this research cannot be conducted over a long period of time. Furthermore, the behavior of individual passengers is directly observed creating problems from the viewpoint of privacy. It is also possible that passengers will behave in an unusual manner since they are overconscious of the research. For these reasons, it is very difficult to accurately monitor passenger traffic with respect to each of origin-desination floor pairs.

In the case of a group control for a group of elevators, it is important to determine which elevator car should respond to a given hall or landing call registered on a service floor in order to operate efficiently. For example, if an elevator car which can first answer a landing call is simply assigned thereto, the elevator car cannot then answer any other landing call, since the car must transfer a passenger or passengers who wait on the service floors. Therefore, in the case of answering any hall call, it is very important to accurately predict a new car call or derived (secondary) call which will be registered by the new passenger in the car.

If the derived call can be accurately predicted, car calls registered in elevator cars which can answer the hall call will be compared with the derived call predicted from the hall call so as to assign the most suitable elevator car to the hall call. As a result, the present car call and the derived call can be responded most efficiently. Namely, the number of stops of elevator cars can be decreased to enhance the service capability of the elevator system. Furthermore, since the most suitable elevator car is assigned to each hall call, an average time (average response time) taken for an elevator car to respond to the hall call can be shortened. As will be apparent from the foregoing, if derived calls to be made in the elevator car can be properly predicted, then a very efficient group control of elevator cars will be efficiently performed.

However, the proper prediction of the derived calls is very difficult to perform. Various studies have been made to solve this problem. For example, according to a prediction method, hall calls registered during the previous elevator operation are recorded together with secondary calls derived from the hall calls to predict secondary calls which will be made during the present elevator operation. This prediction method is very effective when traffic demand is substantially constant. However, when the traffic demand greatly varies according to hours of a day as in office buildings, the prediction accuracy is greatly degraded. Therefore, this prediction method cannot be effectively utilized. Furthermore, the traffic cannot be accurately measured simply by recording the derived calls. As a result, traffic demand cannot be properly predicted.

SUMMARY OF THE INVENTION

It is an object of the present invention to provide a traffic measuring system suitable for group control of elevator cars which can easily and accurately measure the interfloor traffic of passengers utilizing elevator cars.

It is another object of the present invention to provide a traffic recording system suitable for group control of elevator cars which can effectively record interfloor passenger traffic over a long period of time.

It is still another object of the present invention to provide a traffic demand prediction system suitable for group control of elevator cars which can accurately predict derived car calls which are registered in an elevator car which responds to a hall call.

According to a passenger traffic measuring system of the present invention, for each of origin and destination floor pairs, a computer system distributes, in response to information concerning an elevator car position, the number of incoming and outgoing passengers at each stop of the elevator car, and car calls registered in the elevator car, passengers whose destination floors cannot be determined, using probability weights for the origin-destination floor pairs which depend on previous traffic measurements. The distributed passengers are selectively combined with those passengers whose destination floors can be determined, thereby estimating the passenger traffic for each of the origin-destination floor pairs.

According to a passenger traffic recording system of the present invention, measured interfloor traffic is recorded in a compressed form for each origindestination floor pair and for each of predetermined time conditions such as days of the week and time periods of a day.

According to a passenger traffic prediction system of the present invention, average traffic for each origin-destination floor pair per unit time is predicted in accordance with the measured traffic for each origin-destination floor pair. Furthermore, the arrival time of an elevator car responding to a hall call is predicted. Derived car calls at the hall call floor are predicted in accordance with the predicted average traffic and arrival time.

BRIEF DESCRIPTION OF THE DRAWINGS

FIGS. 3 to 10 show data formats and data tables which are used for traffic measurement;

FIGS. 19a to 19f schematically show changes in values of interfloor traffic data;

FIGS. 20 to 25 show data formats and data recording modes which are used in a traffic recording system of the present invention;

FIG. 37 shows a changing traffic demand pattern;

FIG. 38 shows a data format used in traffic prediction;

FIGS. 39 and 40 show table configurations of a memory; and

DETAILED DESCRIPTION OF THE PREFERRED EMBODIMENT

Figure 1:
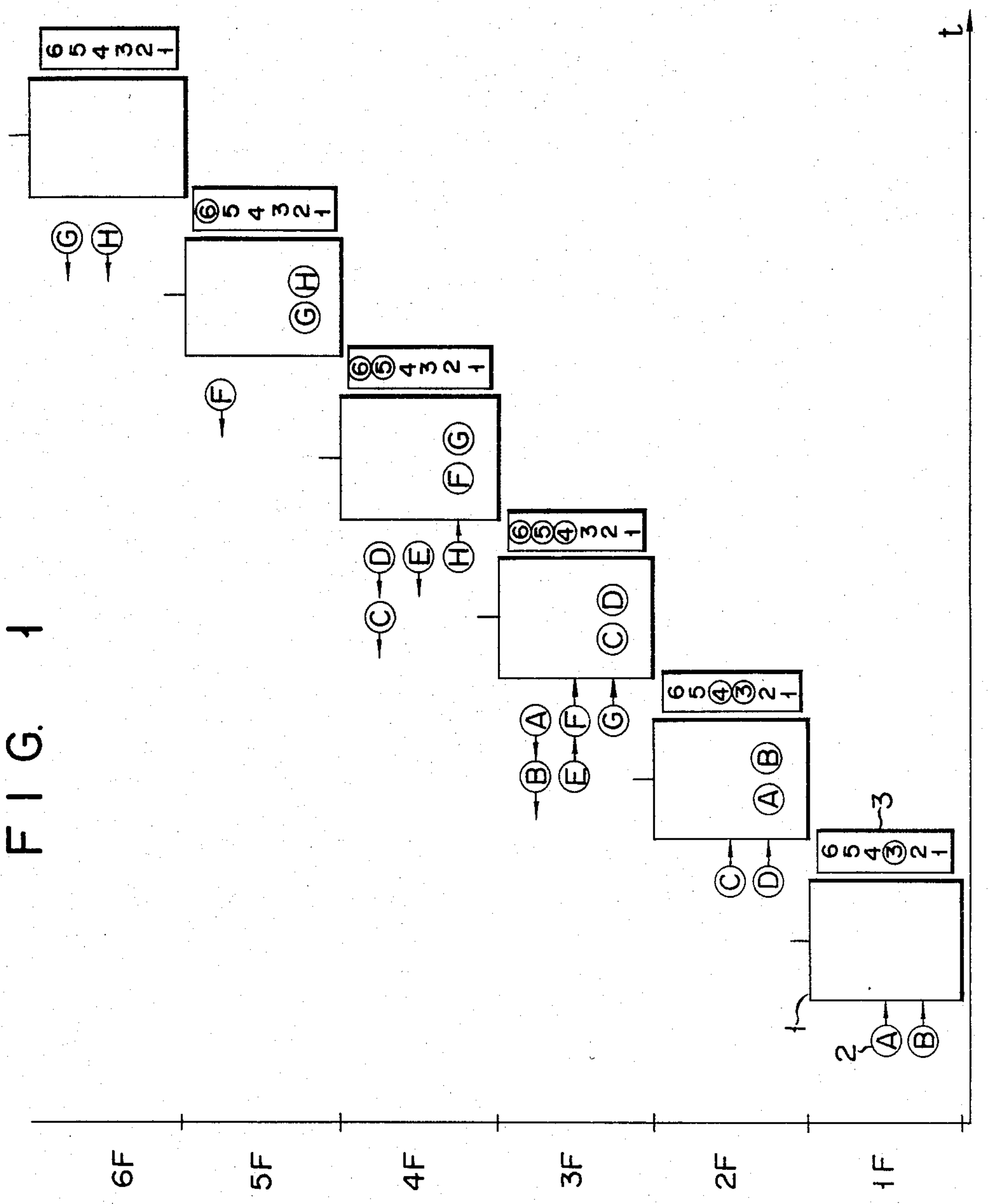
FIG. 1 shows a utilization example of an elevator car.

FIG. 1 shows traffic patterns of passengers utilizing an elevator car. Reference numeral 1 denotes an elevator car; 2, passengers; and 3, destination floors (which are respectively indicated by circles) registered by respective car calls (calls made by passengers 2 in the elevator car 1). The elevator service floor is plotted along the axis of ordinate, and time is plotted along the axis of abscissa, so as to indicate a change in elevator utilization. For example, a passenger Ⓐ enters the elevator car 1 at the first floor and registers the third floor as his destination floor. When the elevator car 1 stops at the third floor, the passenger Ⓐ alights from the elevator car 1.

Figure 2:
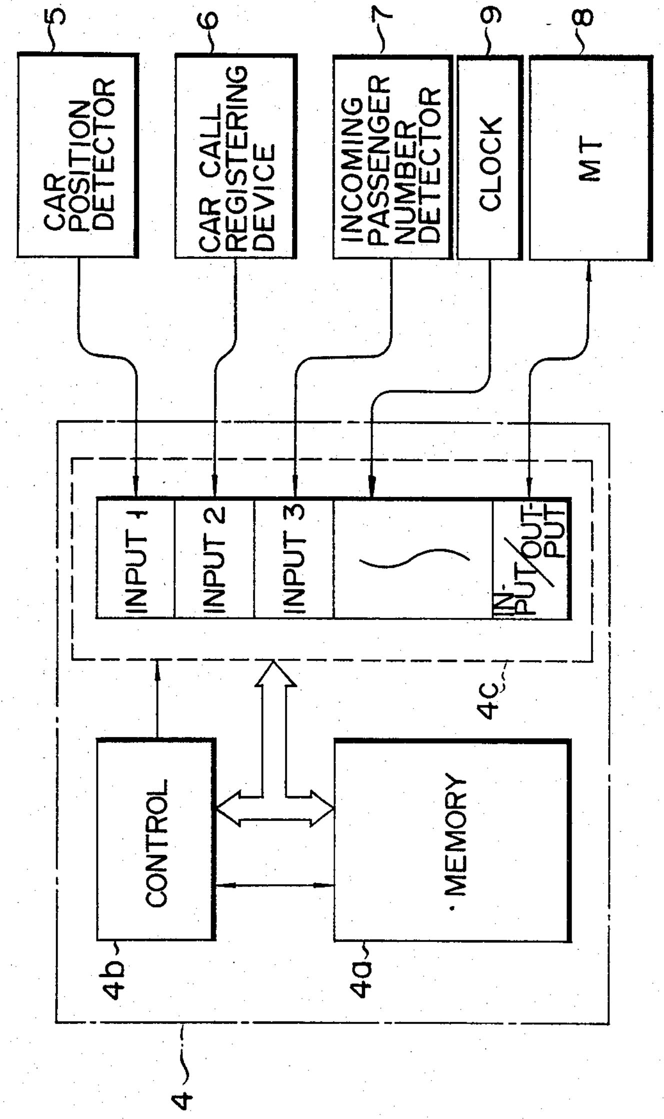
FIG. 2 is a block diagram of a traffic measuring system according to the present invention.

The interfloor traffic is measured, recorded and predicted by a system which has the overall configuration shown in FIG. 2. The system is constituted using an elevator operation control computer 4. The computer 4 operates in accordance with data from a car position detector 5, a car call registering device 6 and an incoming passenger number detector 7. A magnetic tape unit 8 is connected as an external memory to the computer 4 to store the detected data from the detectors. Data directly used for traffic measurement is mainly stored in an internal memory 4a of the computer 4. A control section 4b controls a series of operations to execute the processes of record traffic measurement, recording and prediction. Data exchange between the computer 4 and the car position detector 5, the car call registering device 6, the incoming passenger number detector 7, and the magnetic tape unit 8 are performed through input/output buffers 4c. A clock device 9 is arranged to provide time data.

The car position detector 5 receives position data (pulse signal) of the elevator car 1 in accordance with the rotational angle (number of turns) of a lift mechanism of the elevator car. The car position detector 5 converts the position data to floor data which is then applied to computer 4 as a parallel signal in a format indicated by A in FIG. 3. The floor data is stored in a memory address $A_O$. In this example, the floor data, together with car travel direction data, car door opening/closing data, and data for specifying whether or not the corresponding elevator car is handled as a group, constitutes a data format. The car-call registering device 6 detects and registers a destination floor specified by an incoming passenger upon depression of a pushbutton. The detection data from the car call registering device 6 is stored in a memory address $A_1$ in a data format indicated by B in FIG. 3. The incoming passenger number detector 7 detects the number of incoming and outgoing passengers at an elevator floor stop by detecting a change in weight of the elevator car 1. The number of passengers can be measured in accordance with an assumption that one passenger has a weight of 55 to 60 kg. Data of the number of passengers is stored in a memory address $A_2$ of memory 4a in a format designated at C in FIG. 3. The computer 4 measures the interfloor traffic in accordance with the data stored in the memory. The above-mentioned data are also registered in the magnetic tape unit 8 together with measured time data t the in a data format shown in FIG. 4. The external memory is not limited to the magnetic tape unit 8, but may be a group control unit or any other recording unit such as a floppy disk or a magnetic bubble memory.

Figure 5:
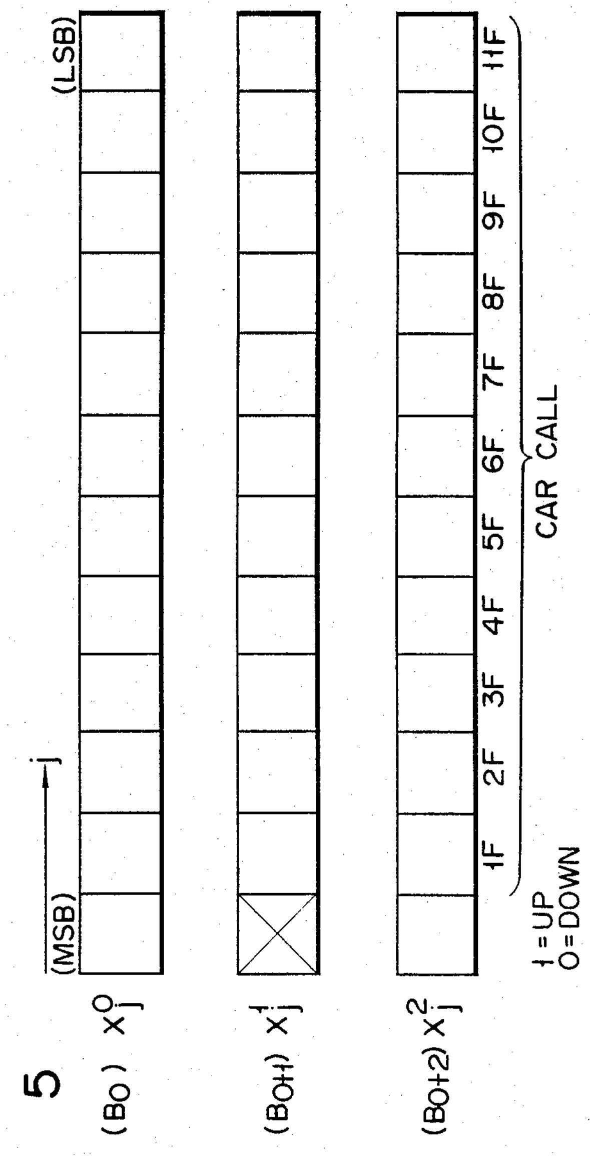

FIG. 5 shows a storage table for storing car call data which has addresses $B_O$ to $B_{O+2}$ in the memory 4a. Previous car call data $x_j^O$ is stored in address $B_O$. New car call data $x_j^l$ is stored in address $B_{O+1}$. Present car call data $x_j^2$ is stored in address $B_{0+2}$. The suffix j of data x indicates the j-th (1~11) destination floor.

Figure 6:
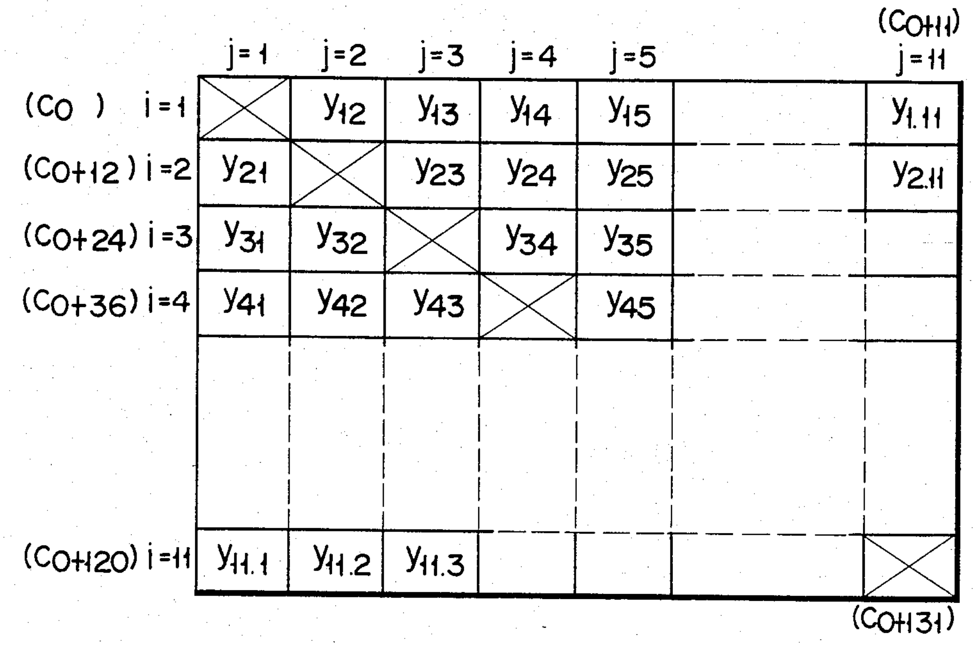

FIG. 6 shows a table for storing interfloor traffic data computed by the computer 4 for each origin-destination floor pair which indicates a combination of an origin (starting) floor i and a destination floor j. The storage table has addresses $C_O$ to $C_{O+131}$. 12-bit word data which indicates the number of passengers transferred from the i-th floor to the j-th floor is stored in each of the addresses $C_O$ to $C_{O+131}$. For example, data $Y_{24}$ which indicates the number of passengers transferred from the second floor to the fourth floor is stored in the address $C_{0+15}$ specified by i=2, j=4. Data y of the number of transferred passengers is obtained by distributing the passengers in accordance with the number of incoming passengers and the car call data as described later. Probability coefficient $P_{ij}$ used in this distribution process is given by an empirical weighting value. The probability coefficients $P_{ij}$ are registered in a table shown in FIG. 7.

FIG. 8 shows a data table for storing incoming passenger number data $W_i$ at the i-th floor, which has addresses $E_{O+1}$ to $E_{O+11}$. FIG. 9 shows a data table for storing outgoing passenger number data $W_j$ at the j-th floor which has addresses $F_{O+1}$ to $F_{O+11}$. These data $W_i$ and $W_j$ are binary data which are obtained by converting the weight change of the elevator car to the number of passengers. The car call registration data is stored in a data table having addresses $G_{0+1}$ to $G_{O+11}$, as shown in FIG. 10.

Figure 11:
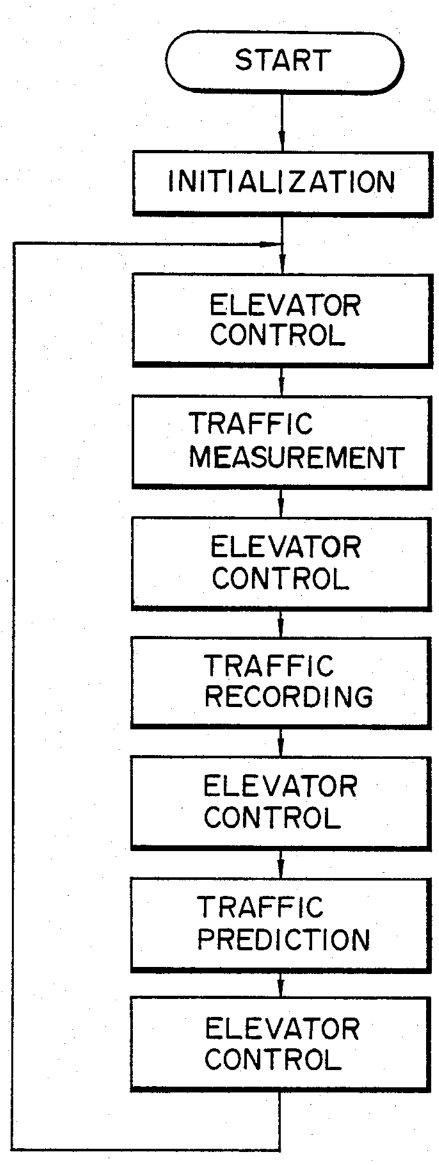
FIG. 11 is a flow chart for explaining the basic operation of the system of FIG. 3.

The measurement, recording and prediction of interfloor traffic according to the present invention will now be described. These operations are performed by a series of operations of the computer 4. The measurement, recording and prediction operations are each executed as a subroutine which is included in a main routine for controlling the elevator cars, as shown in FIG. 11. A measurement method, a recording method and a prediction method of interfloor traffic will be described hereinafter.

Figure 12:
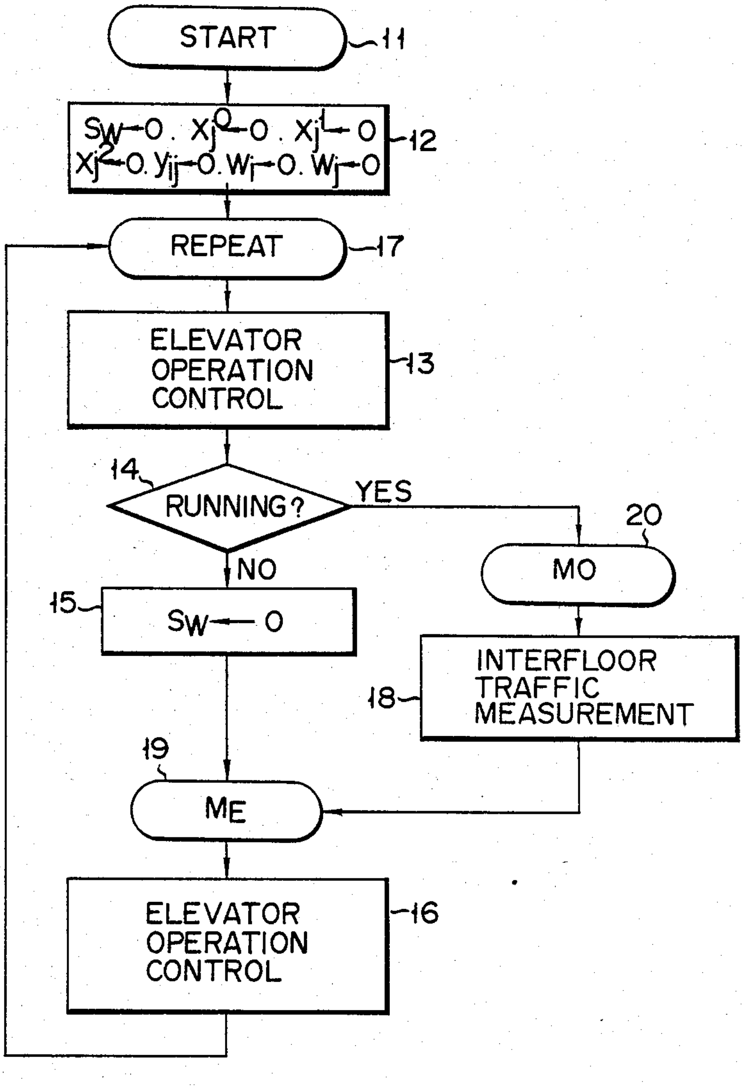
FIGS. 12 to 18 are flow charts for explaining the measurement of interfloor traffic of the elevator cars.
Figure 13:
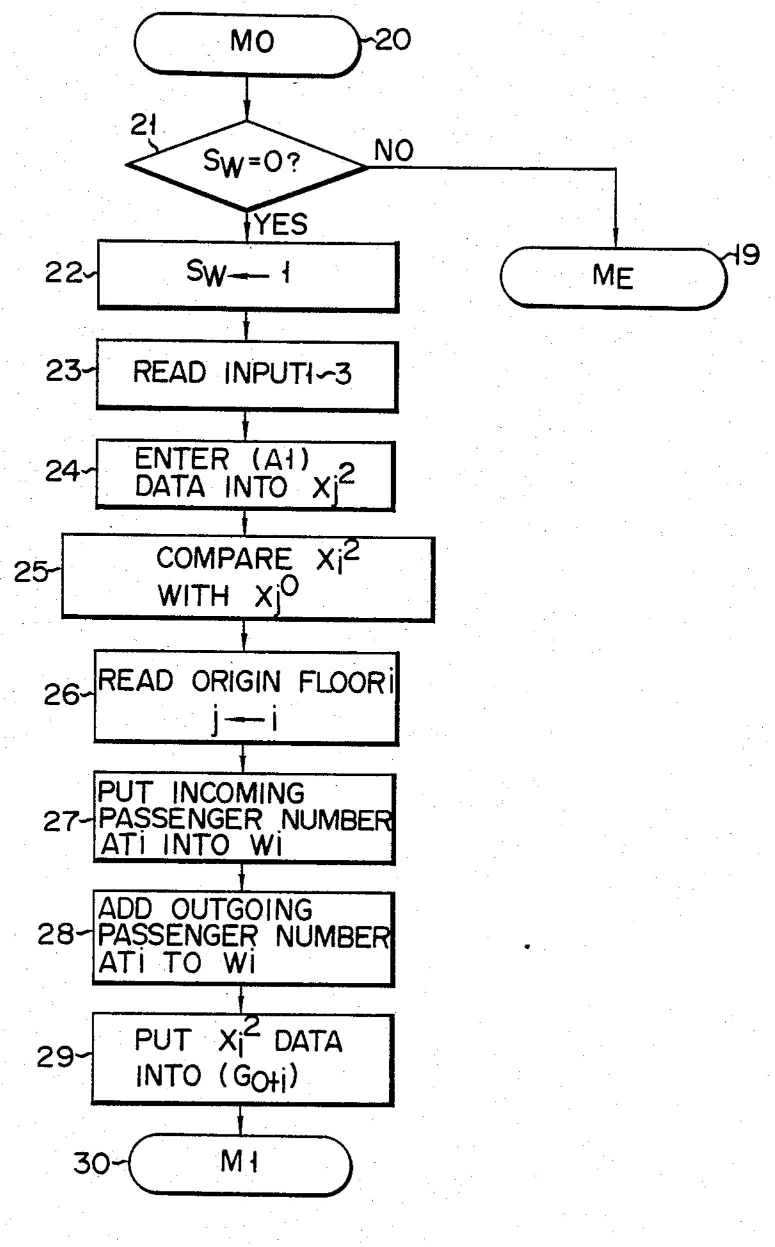

FIG. 12 shows an elevator system control flow which includes the interfloor traffic measurement subroutine. When a start command is given in step 11, an elevator control system, and interfloor traffic measurement, recording and prediction system are initialized in step 12. In step 13, a control subroutine for elevator operation control is executed.

It is then determined in step 14 whether or not the elevator car 1 is running. If NO in step 14, that is, if passengers are entering or leaving the elevator car 1 at a service floor, the routines 15 and 16 are sequentially executed. Thereafter, the flow returns to a repeat point 17, and the above operation 16 is repeated. However, if YES in step 14, that is, if it is determined that the elevator car 1 is running, an interfloor traffic measurement subroutine is executed in step 18. When the interfloor traffic measurement subroutine is completed, the flow returns from step 19 to step 16. Reference numeral 20 denotes a point of jump to the step 18 in which the interfloor traffic measurement subroutine is performed.

When power is supplied to computer 4 and the operation of elevator cars is started, the storage areas of the memory are initialized, and the elevator control system including a switch Sw (flag), to be described later, is initialized as a whole by initial routine 12. Thereafter, in step 13, following repeat point 17, elevator operation control is performed. For example, partial execution or preparation therefor of necessary items for controlling the operation of elevators such as reading of various types of data, cancellation of car call registration, selection of car travel direction, door control, and generation of travel speed pattern of the elevator car is performed. Thereafter, it is determined in step 14 whether the elevator car 1 is running from the presence or absence of an electro-magnetic brake signal. If NO in step 14, that is, if it is determined that the elevator car 1 is stopping, step 16 is executed and any control required for the operation of the elevator other than the abovementioned items is performed. Thereafter, this elevator operation control is repeatedly performed. This main flow of elevator control is substantially the same as that of the conventional elevator control and any conventional control method can be adopted.

When an electro-magnet brake release signal is given to start the elevator car 1 from a service floor while the main flow is being executed, it is determined in step 14 that the car is running. Therefore, in step 18, the interfloor traffic measurement subroutine is performed in the following manner. Here assume that the passengers 2 are transferred between floors by elevator car 1 as shown in FIG. 1.

FIGS. 13 to 18 are flow charts for explaining the interfloor traffic measurement subroutine in step 18. When it is determined to be YES in step 14, as previously described, the interfloor traffic measurement subroutine is started. It is first determined in step 21 whether or not the switch Sw is "0". The switch Sw is provided by a memory area of memory 4a which is assigned with a specific address. When elevator car 1 stops at a reference floor (the first floor), the switch Sw is cleared to "0". If it is YES in step 21, the switch Sw is set to "1" in step 22. Thereafter, the interfloor traffic measurement process is executed. However, if NO in step 21 (e.g., the switch Sw set at "1"), the flow returns to the main routine shown in FIG. 12 through node 19. The data of the switch Sw is used to prevent unnecessary repetition of transfer passenger measurement for the same transfer passengers which would be performed by the repetitive execution of the main routine during car travel. Interfloor traffic measurement is only performed once.

Figure 3:
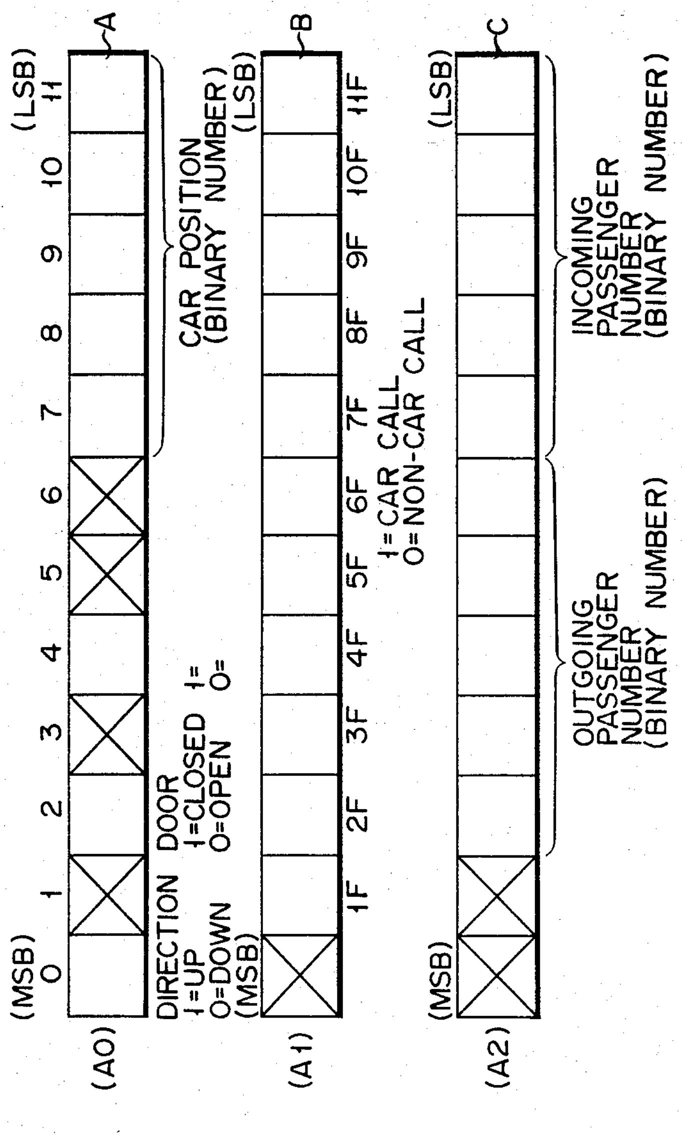

When the interfloor traffic measurement processing is started after the switch Sw has been set to "1", the input/output buffers 4c are sequentially addressed in step 23, thereby reading data obtained by car position detector 5, car call registering device 6 and incoming passenger detector 7. These data have the data formats as shown in FIG. 3 and are stored in the predetermined addresses of internal memory 4a of computer 4. Since data reading is performed immediately after the start command of elevator car 1 is issued, the position of elevator car 1 is a floor at which passengers 2 get on the car (i.e., an origin floor i). The destination floors registered in the car at this time can be detected by corresponding bits of data stored in address $A_1$.

In step 24, 0th-bit data of data A stored in address $A_O$ as shown in FIG. 3 is transferred as current or present car call data $x_j^2$ into the 0th-bit position of data at the address $B_{0+2}$ shown in FIG. 5. The content of the 0th bit is set to "1" during an up trip of car 1 and is set to "0" during a down trip. At the same time, the contents (car call data) of the 1st to 11th bits of data B shown in FIG. 3 are respectively transferred to the lst- to 11th-bit positions of data $x_j^2$. Since a service floor number $n_0$ is 5 here, all the contents of the 6th to 11th bits of data $x_j^2$ are always "0". Thereafter, in step 25, the 0th-bit data of car call data $x_j^0$ in the immediately previous car trip in the same direction is checked, and the 0th-bit data of the car call data $x_j^0$ is exclusive-ORed with the 0th-bit data of the car call data $x_j^2$. A change in the travel direction of the elevator car 1 is detected in accordance with the exclusive-OR result. For example, assume that, in the previous trip, the elevator car 1 went down and stopped at the lowermost floor (the first floor), so that the 0th-bit data of data $x_j^2$ is "0". Since the 0th-bit data of the present data $x_j^2$ is "1" to indicate the up trip of elevator car 1, the result of exclusive OR operation is "1". As a result, the direction of car travel is detected to have changed to an up trip. A change in car travel from up to down can be detected in a similar manner as described above.

In step 26, the car position data stored in the 7th to 11th-bit positions of data A of address $A_0$ is read out and is stored as index data of an origin floor i in a proper register or in proper addresses in the memory. Assume that a destination floor index j coincides with the origin floor index i. In step 27, the incoming passenger number data $W_i$, which indicates the number of passengers who get on the elevator car 1 at the i-th floor and which is stored in the 7th to 11th bit positions of data C of the address $A_2$, is stored in the memory table as shown in FIG. 8. In step 28, the outgoing passenger number data $W_j$, which indicates the number of passengers who get off the elevator car 1 at the i-th floor and which is stored in the 2nd to 6th bit positions of the data C of the address $A_2$, is stored in the memory table as shown in FIG. 9. In step 29, the present car call data $x_j^2$ is stored in the data table shown in FIG. 10, thereby forming a car call data table (KCT). In this example, when the origin floor i is the first floor, the car call status at the first floor is stored in the address $G_{0+1}$. In the case shown in FIG. 1, since a car call is only made for the third floor, data "1" is stored only in the 3rd-bit position. In this case, all the bits in the addresses $G_{0+2}\ldots$, are "0". The car calls at service floors are sequentially stored in the corresponding addresses when the elevator car 1 starts from the corresponding floors. In this example, two passengers 2 indicated by Ⓐ and Ⓑ get on the elevator car 1 at the first floor and register a car call for the third floor. Since the car travel direction has just been reversed, the previous, new and present car call data $x_j^0$, $x_j^1$ and $x_j^2$ *l are respectively represented as follows:*

$x_j^0 = (000000000000)$ $x_j^1 = (x00100000000)$ $x_j^2 = (100100000000)$

The interfloor traffic is then measured in accordance with the operations following connecting point 30, as shown in FIGS. 14 to 18. The interfloor traffic can be obtained by a probability distribution between a determinable traffic (to be described later) and the remaining indeterminable traffic.

The present car call data $x_j^2$ has the following relationship with the previous and new car call data $x_j^0$ and $x_j^1$ with respect to corresponding bits.

$$x_j^2 = x_j^0 + x_j^1 \qquad (1)$$

These data are indicated by "0"or "1".

The interfloor traffic can be determined among the incoming passengers $W_i$ under the following conditions. When a total number of car calls at the i-th floor is 1, that is, $$\sum_{j=i+1}^{n_0} x_j^2 = 1 \text{ (up trip)}$$

or $$\sum_{j=1}^{i-1} x_j^2 = 1 \text{ (down trip)}$$

all the passengers who got on the car at the i-th floor go to the j-th floor at which $x_j^2 = 1$. The number of these passengers is defined as $W_{ij}^*$. When new car call(s) is (are) made at the start from the i-th floor, that is:

$$\sum_{j=i+1}^{n_0} x_j^1 \geqq 1 \text{ (up trip)}$$

or $$\sum_{j=1}^{i-1} x_j^1 \geqq 1 \text{ (down trip)}$$

at least one passenger will go to the new destination floor(s). Therefore, the number of passengers whose destination floor can be determined will be given as follows:

$$\sum_{j=i+1}^{n_0} x_j^1 \text{ (up trip)}$$

or $$\sum_{j=1}^{i-1} x_j^1 \text{ (down trip)}$$

The number $\tilde{W}_i$ of passengers whose destination floors cannot be determined will be represented as follows:

$$\tilde{W}_i = W_i - W_{ij}^* - \sum_{j=i+1}^{n_0} x_j^1 \text{ (up trip)} \qquad (2)$$

or $$\tilde{W}_i = W_i - W_{ij}^* - \sum_{j=1}^{i-1} x_j^1 \text{ (down trip)} \qquad (3)$$

Figure 7:
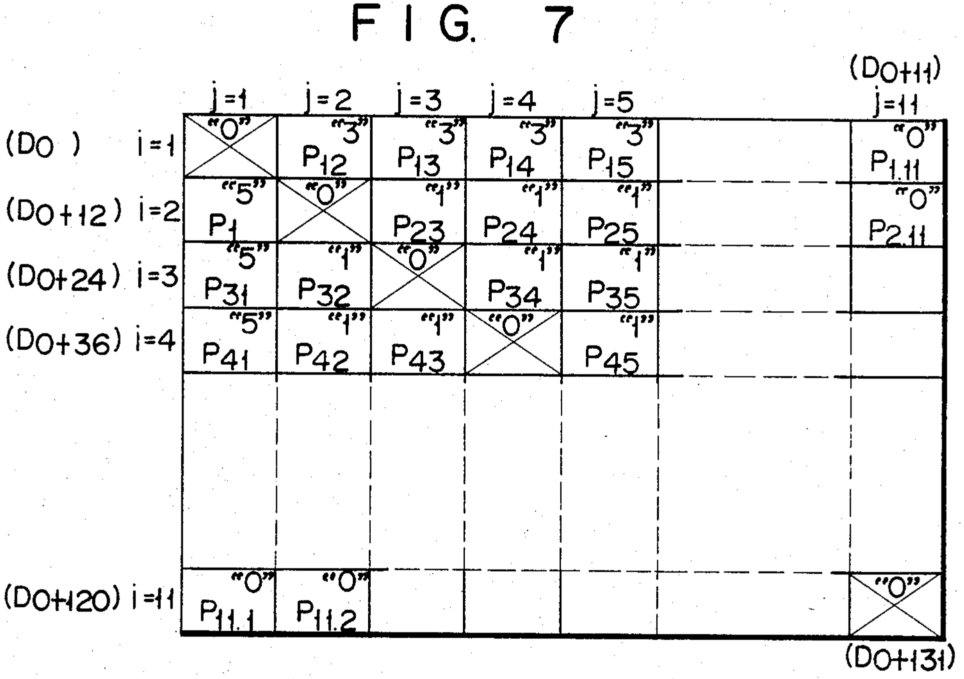

If the indeterminable passengers are distributed to the respective destination floors using the probability weights $P_{ij}$ which are predetermined as shown in FIG. 7, the interfloor traffic for each origin-destination floor pair can be presumably obtained. With respect to the distributon of the indeterminable passengers, either the incoming passenger number $W_i$ or the outgoing passenger number $W_j$ may be used. Either the incoming passenger number or the outgoing passenger number may be selected depending on the information quantity thereof. In general, data which is greater in information quantity is preferred to obtain a high pressumption accuracy. The comparison of imformation quantity may be made between the incoming passenger number and the outgoing passenger number. But, in this case, a precise comparison between the incoming and outgoing passenger numbers need not be performed. Similarly, the indeterminable outgoing passenger number can be calculated by subtracting the determinable outgoing passenger number from the total outgoing passenger number as follows:

$$\tilde{W}_j = W_j - W_{ij}^* - \Delta \qquad (4)$$

wherein α is set to "1" when a new car call is made, whereas it is set to "0" when no new car call is made.

When the above preparation is completed, the number of floors in which $\tilde{W}_i \neq 0$ is compared with the number of floors in which $\tilde{W}_j \neq 0$. The larger number is used in the distribution of interfloor traffic $y_{ij}^0$. When the number of floors in which $\tilde{W}_i \neq 0$ is larger, the distribution of interfloor traffic is performed using the incoming passenger number $W_i$ as follows:

$$Y_{ij}^0 = x_j^2 P_{ij} \tilde{W}_i / \sum_{k=1}^{n_0} x_k^2 P_{ik} \qquad (5)$$

However, when the number of floors in which $\tilde{W}_j \neq 0$ is larger, the distribution of interfloor traffic is performed using the outgoing passenger number $W_j$ *as follows:*

$$Y_{ij}^0 = x_j^2 P_{ij} \tilde{W}_j / \sum_{k=1}^{n_0} x_k^2 P_{ik} \qquad (6)$$

The distributed passenger number given by equation (5) or (6) represents the indeterminable passengers. The determinable passenger number is added to the distributed indeterminable passenger number to obtain the total interfloor traffic as follows:

$$Y_{ij} = Y_{ij}^0 + W_{ij}^* + x_j^1 \qquad (7)$$

The probability weights $P_{ij}$ used in the above computation and stored in a data table shown in FIG. 7, are sequentially corrected in accordance with actually measured data.

Figure 14:
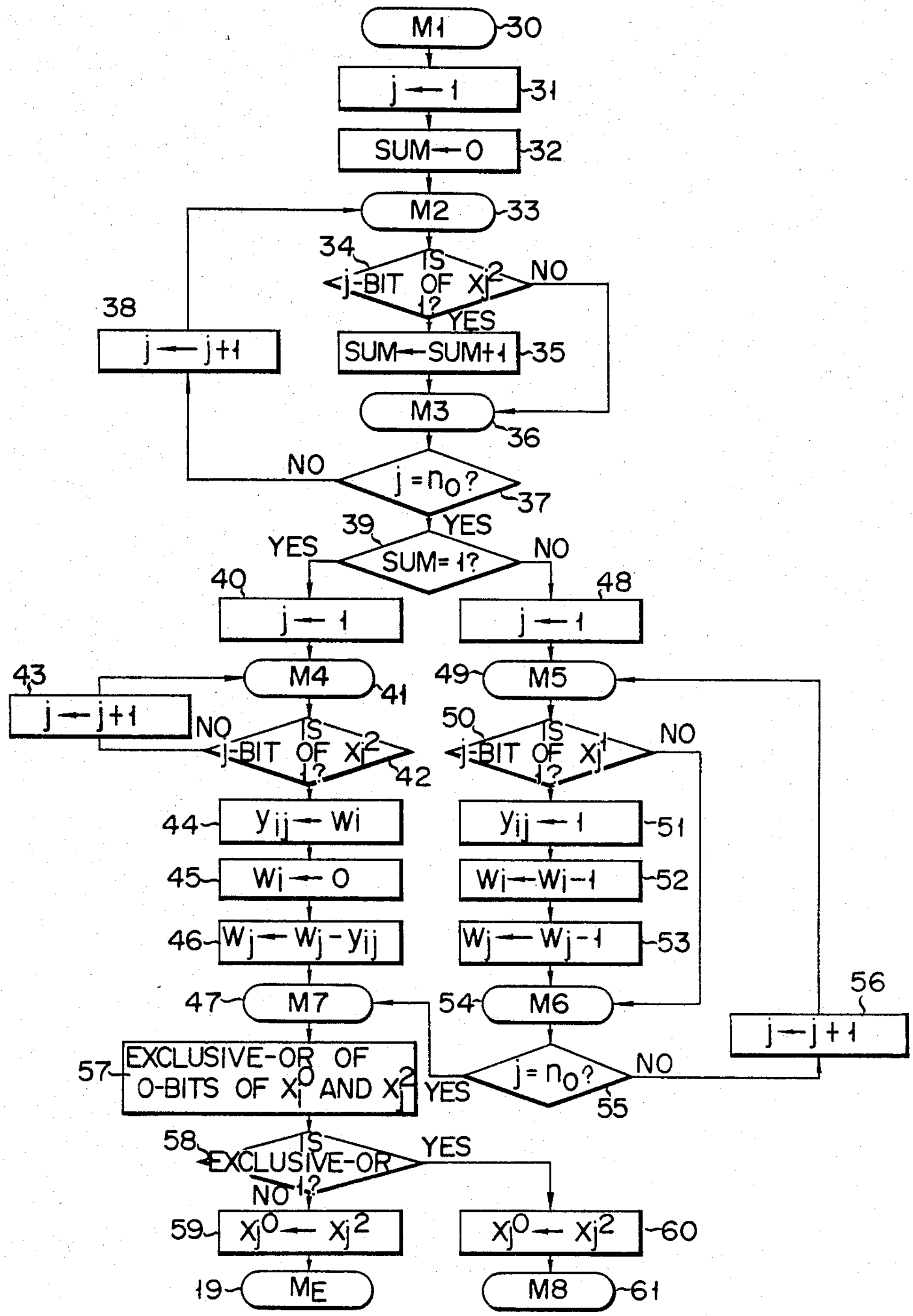

The computer 4 executes the above processes in the following manner. As shown in FIG. 14, in steps 31 and 32, the destination floor index j and the present car-call number SUM are initialized. Thereafter, in steps 33 to 38, in order to check whether the number SUM of the present car calls is 1 or not the data SUM is obtained as follows. It is sequentially determined whether or not the j-th bit of the present car call data $x_j^2$ is "1". Then the number of the bits which are "1" is accumulated to obtain the data SUM in step 35. It is then determined in step 39 whether or not the data SUM is "1". If YES in step 39, it is determined in a repetition loop comprising steps 40 to 43 which bit of the present car call data $x_j^2$ is "1", that is, for which floor a car call is registered. Thereafter, in step 44, the incoming passenger number $W_i$ is stored in a memory address of data $y_{ij}$ which is specified by i and j. In step 45, the data $W_i$ at the present floor i is cleared. Thereafter, in step 46, the data $y_{ij}$ is subtracted from the passenger number $W_j$ for the destination floor j. The flow advances to the next processes through connecting point 47. It is noted that the value obtained in step 46 may be negative. In this example, since $y_{13}=2$ as shown in FIG. 1, $$W_i=W_1=2\rightarrow 0$$

$$W_j=W_3=0\rightarrow -2$$

At this point of time, only the data $y_{ij}$, $W_i$ and $W_j$ are set as shown in FIG. 19*a*, and any other data are "0".

If it is determined in step 39 that the data SUM is "2" or more, steps 48 to 56 are executed. In these steps 48 to 56, passengers whose floor are not determinable are distributed with respect to newly registered destination floors. More specifically, in step 48, j is set to "1". Thereafter, the respective bits of the new car call data $x_j^1$ are sequentially checked to seek the destination floors in which corresponding bits are "1". In step 51, $y_{ij}$ is set to "1". In step 52, the incoming passenger number $W_i$ at the i-th floor is decremented by "1". The outgoing passenger number $W_j$ at the j-th floor is also decremented by "1" in step 53. The above operations are repeated for all the destination floors j. It is noted that the above operations are executed only with respect to floors for which car calls are newly registered.

Step 57 is then executed through the connecting point 47. In step 57, the 0th bit of the previous car call data $x_j^0$ in the same car travel direction is checked. The 0th bit of the present car call data $x_j^2$ is exclusive-ORed with that of the previous car call data $x_j^0$. The result indicates the presence or absence of a change in the car travel direction. In this example, since the elevator car 1 has gone down and has stopped at the lowermost floor (the first floor), the 0th bit of the previous car call data $x_j^0$ is set to "0". However, the 0th bit of the present car call data $x_j^2$ is set to "1" since the elevator car 1 is going up. The exclusive-ORed result is thus "1". In step 58, the above result is checked, and the previous car call data $x_j^0$ is updated by the present car call data $x_j^2$. Then, the next process is executed through connecting point 19 or 61.

Figure 15:
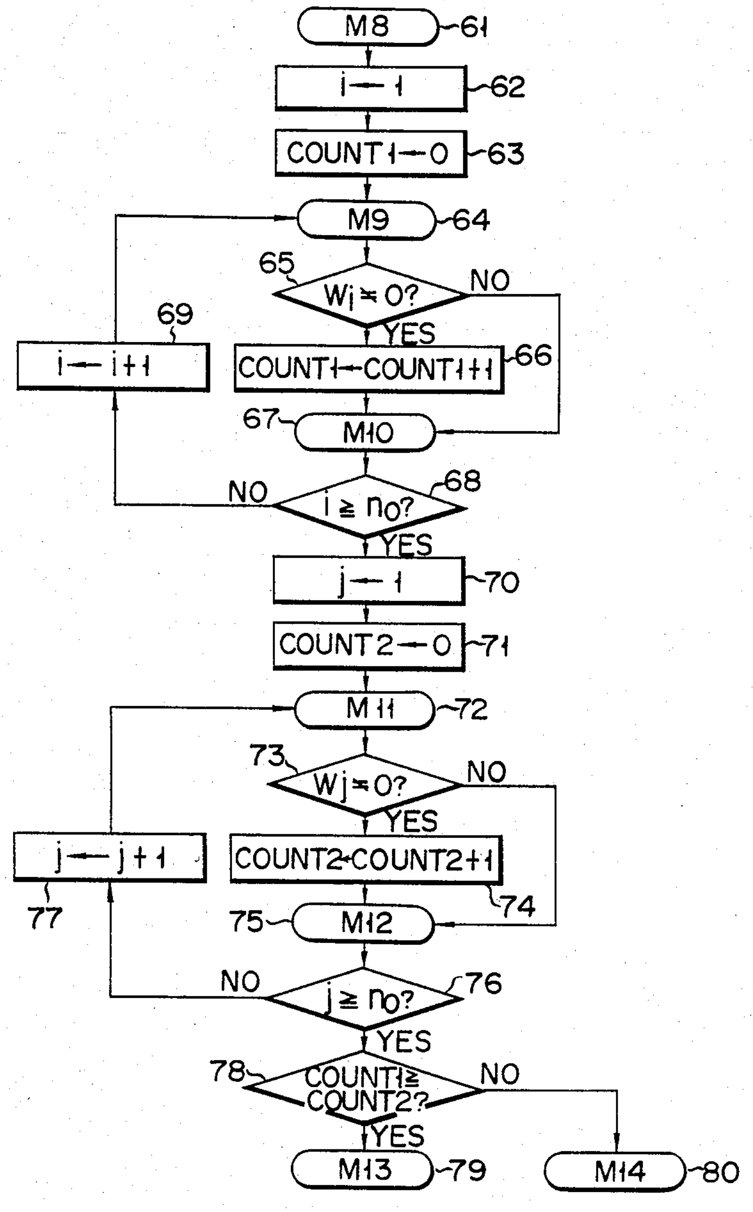
Figure 16:
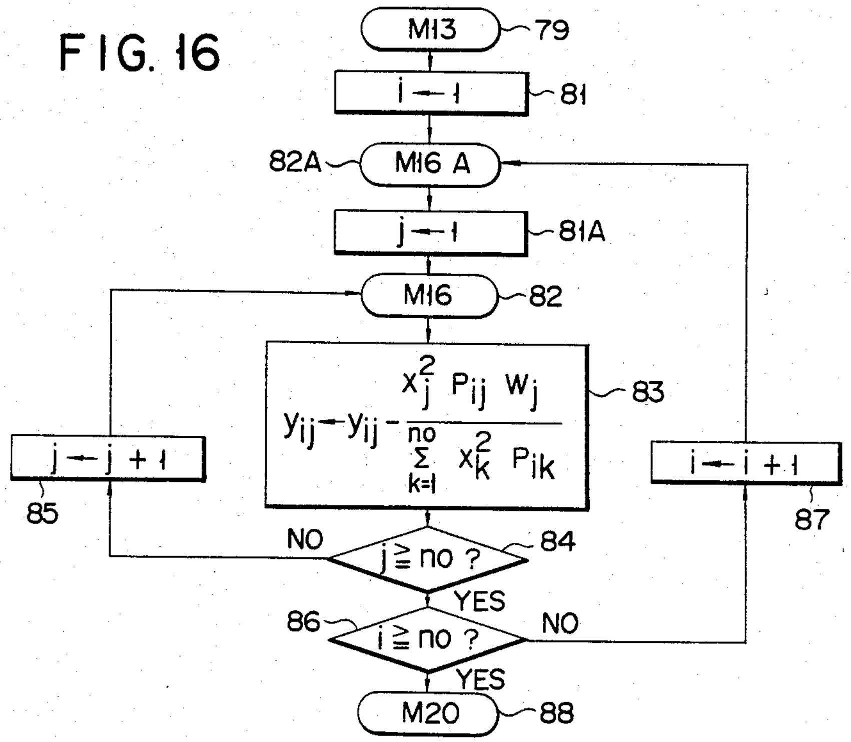
Figure 17:
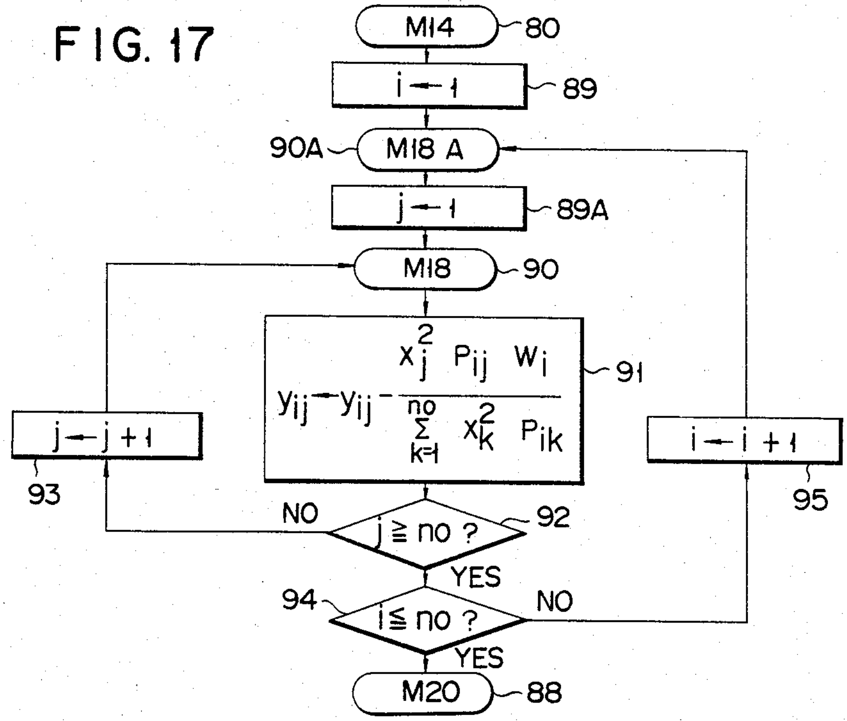

The operations following point 61 presume the data $y_{ij}$, as shown in FIG. 15 to 17. Points 61 and 88 are always passed in each single operation cycle. The presumption process will be described later.

Figure 4:
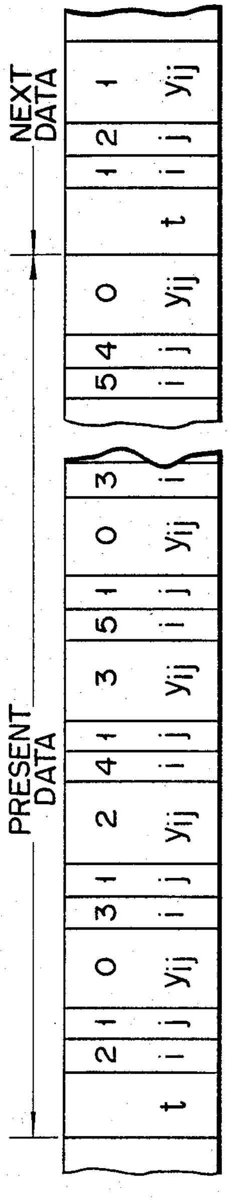
Figure 18:
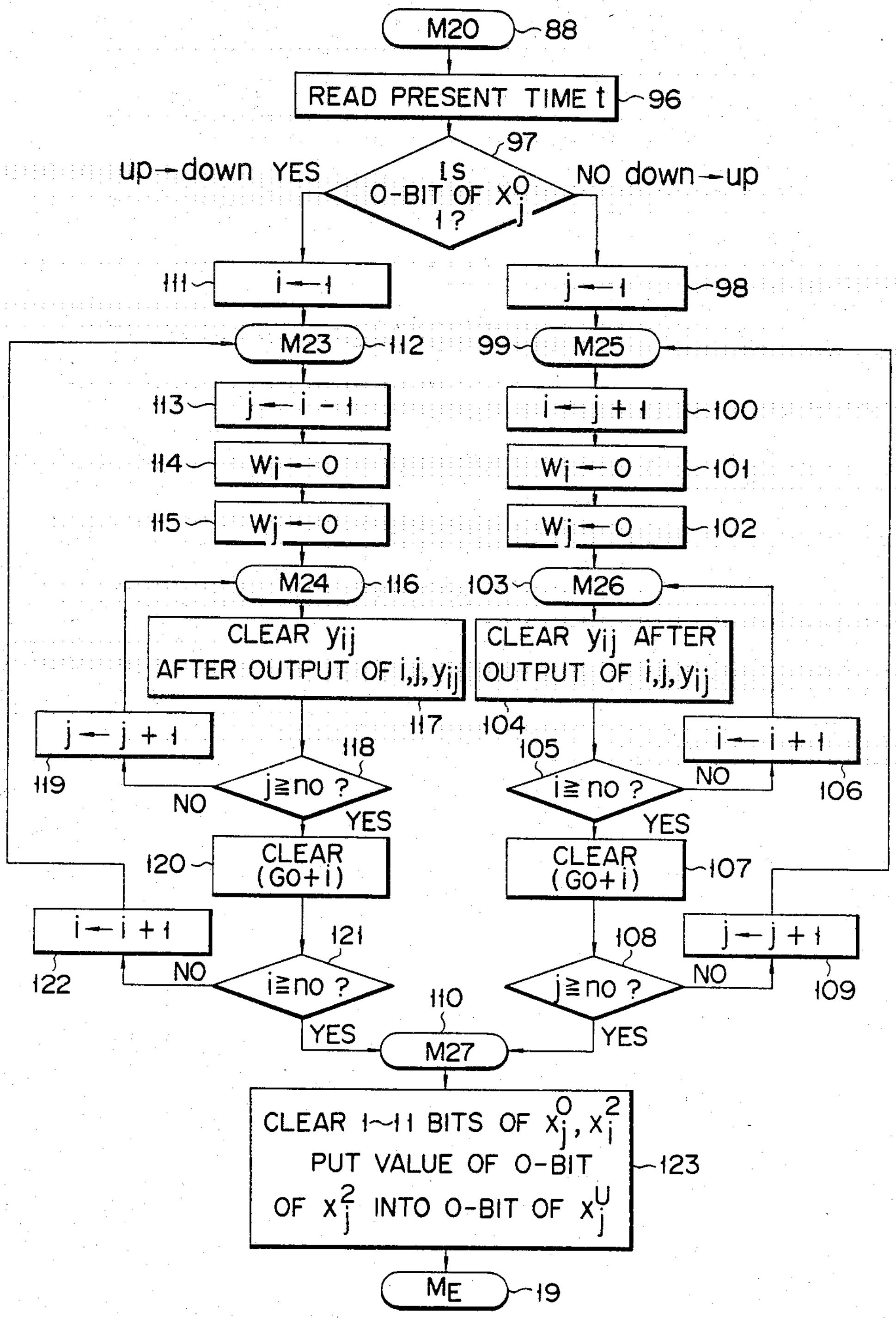

The operation routine shown in FIG. 18 following the connecting point 88 outputs the interfloor traffic obtained during the previous car travel at the time of a change in the car travel direction. In step 96, an output buffer is addressed, and at the same time the present time t of the clock device 9 is read out. In other words, the present time t sets the starting point of data. In step 97, the 0th bit of the previous car call data $x_j^0$ is checked to determine the previous travel direction of the elevator car 1. More particularly, it is determined whether the travel direction of the elevator car 1 has changed from up to down or from down to up. In this example, the elevator car 1 has previously gone down and now starts from the first floor, so that the 0th bit of the previous car call data $x_j^0$ is set to "0", and step 98 is thus executed. In step 98, the destination floor index j is set to "1", and step 100 after node 99 is executed. In step 100, the origin floor index i is set to (j+1). Thereafter, in steps 101 and 102, data $W_i$ and $W_j$ are cleared using the set value of origin floor index i. Thus, the preparation for the next processes is completed. In step 104, data i, j, and $y_{ij}$ are output. Thereafter, in step 106, only the data i is incremented by "1" to repeat the above data output. When data output for all the origin floors i of the service floor number $n_0$ is completed, data in the address $G_{0+j+i}$ of the KCT shown in FIG. 10 is cleared in step 107. The data j is incremented by "1" through steps 108 and 109 to repeat the above operations. In this way, the data output is effected for each origin-destination floor pair which is determined by a combination of the origin floor i and the destination floor j. The data output format is shown in FIG. 4. When this data output is completed, step 123 is executed through connecting point 110. In step 123, the 1 st to 11th bit of the previous and present car call data $x_j^0$ and $x_j^2$ are cleared. The 0th-bit of the previous car call data $x_j^0$ is substituted by the 0th-bit of the present car call data $x_j^2$. Therefter, the flow returns to the main routine shown in FIG. 12.

When the travel direction of the elevator car 1 has changed from up to down, steps 97 and 111 to 122 are executed. The operation in steps 111 to 122 is substantially the same as that in steps 98 to 109. The data are sequentially output as in the steps 98 to 109. The flow returns to the main routine through connecting point 110.

The interfloor traffic presumption process which is an essential feature of the present invention is performed as follows. The presumption operation is not performed during car travel which is detected by the switch Sw shown in FIG. 13. When the elevator car 1 starts from the first floor and is braked for a stop at the second floor in response to a hall call at the second floor, the switch Sw is cleared to "0". Thereafter, when the elevator car 1 starts from the second floor, the subroutine for interfloor traffic measurement is executed again. In this condition, since the switch Sw is "0", the operation starts from step 22. Since, in this case, $i=2$ $x_j^0=(100100000000)$ $x_j^1=(x00010000000)$ $x_j^2=(100110000000)$ the following data will be obtained $W_i=W_2=2$ $W_j=W_2=0$ Referring again to FIG. 1, since two passengers alight from the elevator car 1 at the third floor, three passengers enter the elevator car 1 there, and car calls for the fifth and sixth floors are made, the previous, new and present car call data $x_j^0$, $x_j^1$ and $x_j^2$, and incoming and outgoing passenger number data $W_i$ and $W_j$ are given as follows:

$x_j^0=(100110000000)$ $x_j^1=(x00001100000)$
$x_j^2=(100011100000)$
$W_i=W_3=3$
$W_j=W_3=2$

The above processes are performed as shown in FIGS. 19a to 19f.

In the flow shown in FIGS. 15 to 17, the data i and data COUNT 1 are initialized. In steps 64 to 69, the data COUNT 1 is incremented every time $W_i \neq 0$ is detected so as to check the numbers of data in which $W_i \neq 0$ using the data i as an index. Thereafter, in steps 70 to 77, the number of data in which $W_j \neq 0$ is checked using the data j as an index. In other words, data COUNT 2 is incremented every time $W_j \neq 0$ is detected.

In step 78, the data COUNT 1 is compared with the data COUNT 2 to determine which of data $W_i$ and $W_j$ is to be used for the distribution process of passengers. The data which is greater in information quantity is used as previously described. For example, when the data COUNT 1 is greater than the data COUNT 2, the presumption process is performed in steps 79 to 87 shown in FIG. 16. However, when the data COUNT 2 is greater than the data COUNT 1, the distribution process is performed in steps 80 to 95 shown in FIG. 17. The presumption is performed in accordance with equation (7). It is noted that the number of passengers whose destination floors can be determined is registered as $y_{ij}$ and $W_i$ is given as $\tilde{W}_i$ obtained by subtracting the determined passenger number from the total incoming passenger number $W_i$.

For example, if i=3, then $$\sum_{k=1}^{n_0} x_k^2 P_{ik} = x_1^2 P_{31} + x_2^2 P_{32} + x_3^2 P_{33} + x_4^2 P_{34} + x_5^2 P_{35} + x_6^2 P_{36}$$

$$= 0 \times 5 + 0 \times 1 + 0 \times 0 + 1 \times 1 + 1 \times 1 + 1 \times 1 = 3$$

Equation (7) corresponds to such a data process performed in the computer 4 as represented by $$y_{ij} \leftarrow y_{ij} + x_j^2 P_{ij} W_i / \sum_{k=1}^{n_0} x_k^2 P_{ik} \tag{8}$$

In this case, therefore, values of $y_{ij}$ can be obtained by sequentially incrementing the value j as follows:

$y_{31}=0+(0\times5\times1)/3=0$
$y_{32}=0+(0\times5\times1)/3=0$
$y_{33}=0+(0\times0\times1)/3=0$
$y_{34}=1+(1\times1\times1)/3\approx1.33$
$y_{35}=1+(1\times1\times1)/3\approx1.33$
$y_{36}=1+(1\times1\times1)/3\approx1.33$ The above operations are repeatedly executed up to $i=n_0$ and $j=n_0$. At the end of the operations the following results are obtained.

| | | Destination floor j | | | | | | Incoming passenger number |
|---|---|---|---|---|---|---|---|---|
| | | 1 | 2 | 3 | 4 | 5 | 6 | $W_i$ |
| Origin floor i | 1 | | 0 | 2 | 0 | 0 | 0 | 2 |
| | | | 0 | (2) | 0 | 0 | 0 | (2) |
| | 2 | 0 | | 0.5 | 1.5 | 0 | 0 | 2 |
| | | (0) | | (0) | (2) | 0 | 0 | (2) |
| | 3 | 0 | 0 | | 0.33 | 1.33 | 1.33 | 3 |
| | | (0) | (0) | | (1) | (1) | (1) | (3) |
| | 4 | 0 | 0 | 0 | | 0.5 | 0.5 | 1 |
| | | (0) | (0) | (0) | | (0) | (1) | (1) |
| | 5 | 0 | 0 | 0 | 0 | | 0 | 0 |
| | | (0) | (0) | (0) | (0) | | (0) | (0) |
| | 6 | 0 | 0 | 0 | 0 | 0 | | 0 |
| | | (0) | (0) | (0) | (0) | (0) | | (0) |
| Outgoing passenger number $W_j$ | | 0 | 0 | 2 | 3 | 1 | 2 | |
| | | (0) | (0) | (2) | (3) | (1) | (2) | |

Data in parentheses indicates the actual number of incoming or outgoing passengers. As may be apparent from the above table, slight errors occur, but highly precise presumption of the interfloor traffic can be achieved. Furthermore, data can be obtained in a real time manner, so that the system according to the present invention is greatly improved in comparison with the conventional system. The obtained data can be regarded as sufficiently precise to be used in practice.

According to the present invention, the interfloor traffic may be effectively calculated when the travel direction of the elevator car 1 is changed. After the interfloor traffic data has been output the data table is initialized and then next data acquisition is started. Therefore, interfloor traffic measurement can be continuously performed over a long period of time. In the case of setting the probability weights $P_{ij}$, these weights are subsequently corrected on the basis of comparison between the presumption data and the actually measured data, thereby greatly improving the precision of interfloor traffic presumption. In the above description, it is assumed that the incoming passenger always registers his destination floor. Although the passenger may in practice forget to register his destination floor, such a case is very rare and can be neglected. Therefore, no problem occurs if this case is regarded as equivalent to no passenger entering the elevator car. In executing of processes described above, it is desired that denominators are checked in calculation process so that, when the denominators are "0", the operation results are forced to be "0", thereby preventing the overflow of the operation.

The recording system of the interfloor traffic measurements will be described hereinafter. The measured data of the interfloor traffic is obtained by the computer 4 in a format shown in FIG. 20 in accordance with data from the car position detector 5, the car call registering device 6, the incoming passenger number detector 7 and the clock device 9, every time the travel direction of the elevator car is changed. Each set of data comprises binary numbers which respectively indicate the origin floor i, the destination floor j, time t of the hall call or the car call, and the transfer passenger number k from the origin floor to the destination floor. End data is inserted at the end of a series of sets of data.

A data structure area of the internal memory (RAM) 4a of the computer 4 is assigned to each of days of the week indicated by m, as shown in FIG. 21. The retrieval and updating of the interfloor traffic measured data will be performed by operating the data structures shown in FIG. 21 each day of the week. Data areas $x^m$, $y^m$ and $z^m$ have one-dimensional data array structures of 16-bit one-word data element and start from addresses $x_0{}^m$, $y_0{}^m$ and $z_0{}^m$, respectively. The addresses of data areas correspond to each other. The data area $x^m$ stores origin-destination floor pair data (i, j) which is determined by the origin floor i and the destination floor j, and corresponding time data $t^m$. The pair (i, j) is expressed by a loop of the pointers which starts from the Ath element $x_{(A)}{}^m$ and returns thereto. The time data $t^m$ is given as another element. The data area $y^m$ stores prediction data which indicates how many passengers are transferred on average in a time period corresponding to a pointer element $x_{(l)}{}^m$. The data stored in the data area $y^m$ provides a traffic demand pattern of the elevator system. The data area $z^m$ stores updated empirical data for updating data in the data areas $x^m$ and $y^m$.

The origin-destination floor pair indicated by the pointer loop is expressed as follows. A series of numbers are assigned to all service floors of the elevator car. For example, when it is assumed that five service floors are available, and that interfloor traffic measurements are to be performed for every origin-destination floor pair, numbers h (h=1, 2, 3 to 20) are assigned to all possible origin-destination floor pairs (i, j), respectively as shown in FIG. 22*a*. So long as the numbers h correspond one-to-one to the origin-destination floor pairs (i, j), the order of assignment of the numbers is not limited. If origin-destination floor pairs (i, j), which have little traffic and can be neglected, can be known in advance, these origin-destination floors can be eliminated from the pointer loop, and the number assignment may be done as shown in FIG. 22*b*. The number m can take any value. In the following description, for illustrative convenience, the number of service floors is 3 and number assignment is performed in a manner as shown in FIG. 22*c*.

Figure 23:
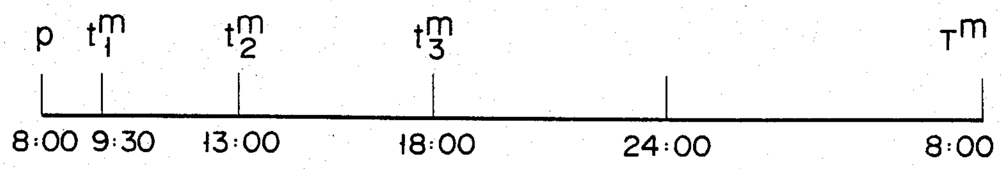
Figure 24:
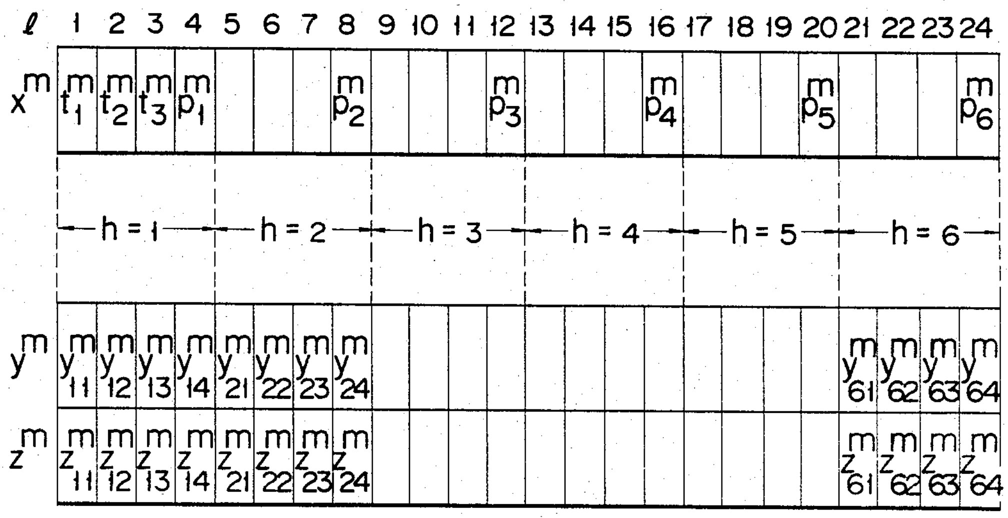

The data area $x^m$ shown in FIG. 21 is divided according to the numbers (pointers) h. More particularly, when data is acquisited in four time periods as shown in FIG. 23 for an elevator which serves three floors, the data area $x^m$ comprises the pointers h of 1, 2, 3, 4, 5 and 6, and 24 words as data quantity A, as shown in FIG. 24. A area portion partitioned by a pointer corresponds to one origin-destination floor pair. In this example, $x_{(5)}{}^m$, $x_{(6)}{}^m$, $x_{(7)}{}^m$ correspond to the origin-destination floor pair h=2.

The data area portion corresponding to a specific origin-destination floor pair h is determined by counting the number of pointers starting from a pointer position $x_{(A)}{}^m$ through the pointer loop. For example, the area portion corresponding to h=2 is determined to be a portion corresponding to a pointer position l=8 following a pointer position l=4 next to the $x_{(A)}{}^m$. Therefore, the data area portion having the addresses $x_{(5)}{}^m$ to $x_{(8)}{}^m$ corresponding to the word next to the pointer position l=5 to the second pointer position l=8 is assigned to the area of h=2. In general, when m is specified, the data area portion corresponding to h is assigned to a portion from a word next to the (h−1)th pointer position from the address $x_{(A)}{}^m$ to a word corresponding to the hth pointer position.

Figure 25:
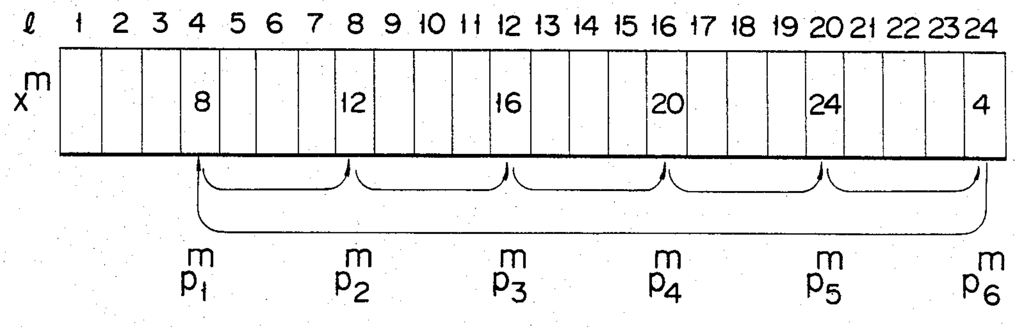

Data $t_1{}^m$ shown in FIG. 24 indicates a time interval (0, $t_1{}^m$) from time 0 to time $t_1{}^m$. Data during the time interval are given as $y_{h1}{}^m$ and $z_{h1}{}^m$. Similarly, data $t_2{}^m$ and $t_3{}^m$ indicate time intervals ($t_1{}^m$, $t_2{}^m$) and ($t_2{}^m$, $t_3{}^m$), respectively. Data obtained during the time intervals are given as $y_{h2}{}^m$ and $z_{h2}{}^m$ and as $y_{h3}{}^m$ and $z_{h3}{}^m$, respectively. The data $y_{h4}{}^m$ and $z_{h4}{}^m$ are data obtained during the time interval ($t_3{}^m$, $T^m$) from time $t_3$ to the next day time 0 (=$T^m$). The time $T^m$ need not be set to AM 0:00. The connection of pointers in the data structure shown in FIG. 24 is schematically illustrated in FIG. 25.

The data area portions in the data area $x^m$ are connected by the pointers, and data areas $y^m$ and $z^m$ are specified by data area $x^m$. As previously described, an area portion of data area $y^m$ specified by a pointer stores data which indicates the predicted number of passengers in a specified time interval with respect to the origin-destination floor pair h. The data area $z^m$ stores the actual interfloor traffic under the same condition described above. Therefore, the measured interfloor traffic data are recorded for each of the origin-destination floor pairs and each of the time intervals.

The value of m is given by the clock device 9 so as to distinguish between days of the week. For example, data (00) represents Sunday, and data (01) to (06) respectively represent Monday to Saturday.

The data recording system will now be described hereinafter.

Figure 26:
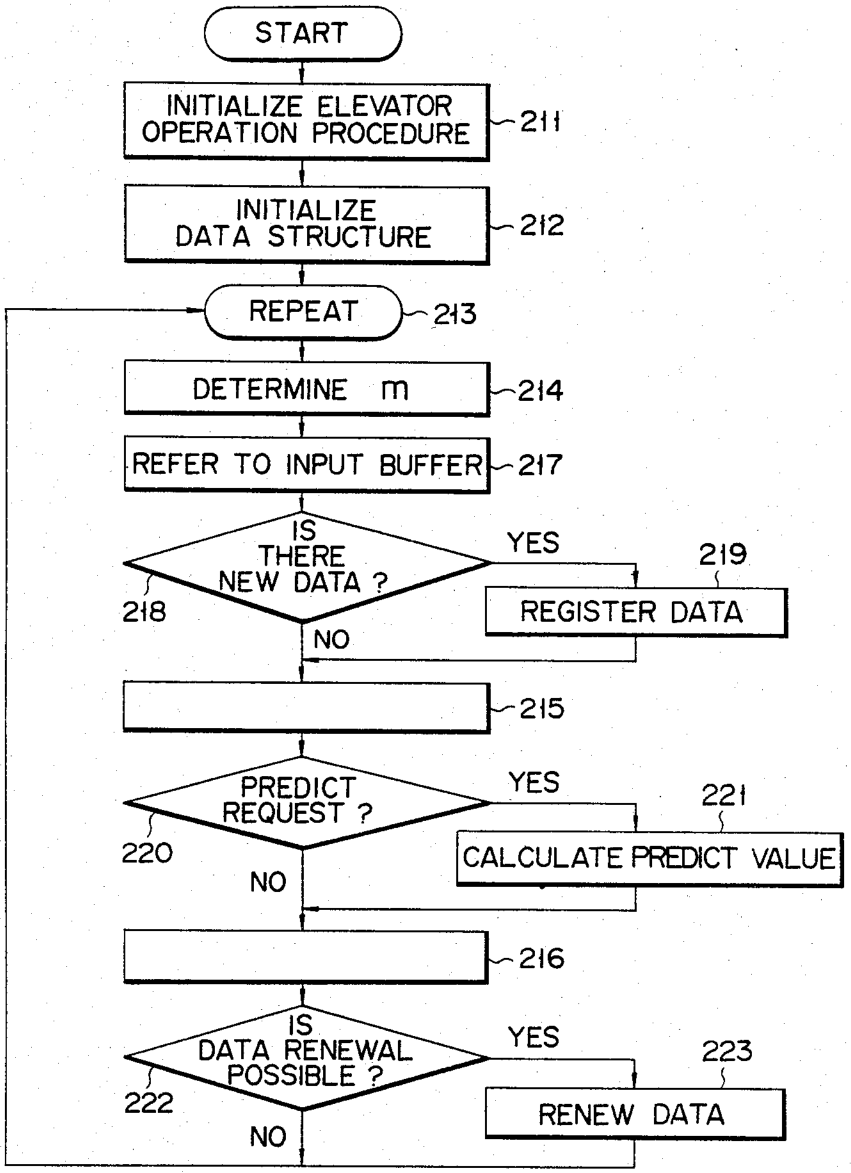
FIGS. 26 to 33 are flow charts for explaining the operation of the traffic recording system of the present invention.

FIG. 26 mainly shows a routine of recording process incorporated in the main routine of the elevator system shown in FIG. 11.

When the control program is initiated, the elevator operation procedure is initialized in step 211. In step 212, the data structure shown in FIG. 21 is initialized. Thereafter, the number m is determined (specified) in step 214 through repeat point 213, and then the elevator control procedure is repeated steps 215 and 216. It is noted that the number m indicates data of day of the week. In step 217, the input buffer is referred to by the determined number m. It is then determined in step 218 whether or not new data is present in the input buffer. If YES in step 218, the flow jumps to subroutine 219 in which the new data is stored in the data area $z^m$. It is noted that the presence or absence of the new data is determined by referring to data in the input buffer 4*c*.

Thereafter, it is determined in step 220 whether or not a prediction request is present for a given origin-destination floor pair within a given time interval. If YES in step 220, necessary data is retrieved in subroutine 221 from the data structure shown in FIG. 21, thereby performing a prediction calculation to be described later. After the prediction calculation is completed or if NO in step 220, the control procedure is performed in step 216. It is then determined in step 222 whether or not data renewal or updating may be made. If YES in step 222, subroutine 223 is executed to update the data structure shown in FIG. 21. This updating of the data structure in FIG. 21 is performed by changing the contents of the data structures x and y on the basis of the data registered in the data structure z.

The above-mentioned operations are data processing procedures according to the present recording system.

Figure 27:
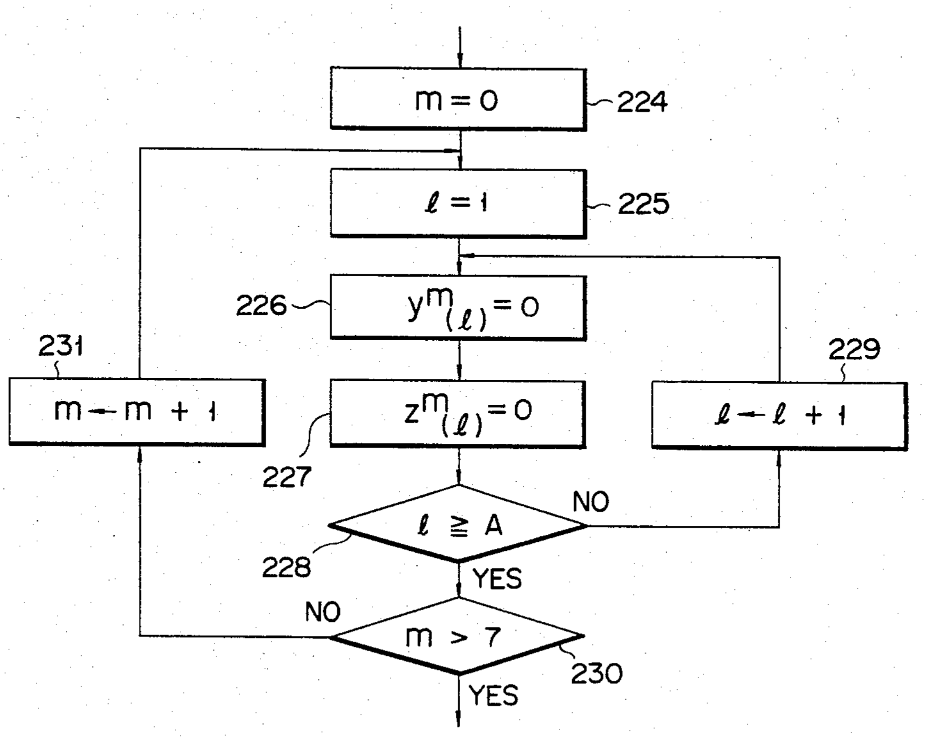

The initilization of the data structures in step 212 is performed in a manner as shown in FIG. 27. The data structures x, y and z are cleared to "0". In step 224, the value m is set to "0". In step 225, l is set to "1". In steps 226 and 227, values $y_{(l)}{}^m$ and $z_{(l)}{}^m$ specified by l are set to "0". It is then determined in step 228 whether or not l has reached A. If NO in step 228, l is incremented in step 229. Thereafter, in step 230, the number m is checked. If the number m does not reach "7", the number m is incremented in step 231. The series of the above operations are repeated. Thus, all the contents in the data structure of FIG. 21 are set to "0".

In this condition, if the first word of the data stored in the input buffer 4*c* is read out and if no new data is present in the input buffer 4*c*, the end signal (e.g., END OF FILE) of the previous data remains, thereby determining whether or not new data is present.

Figure 28:
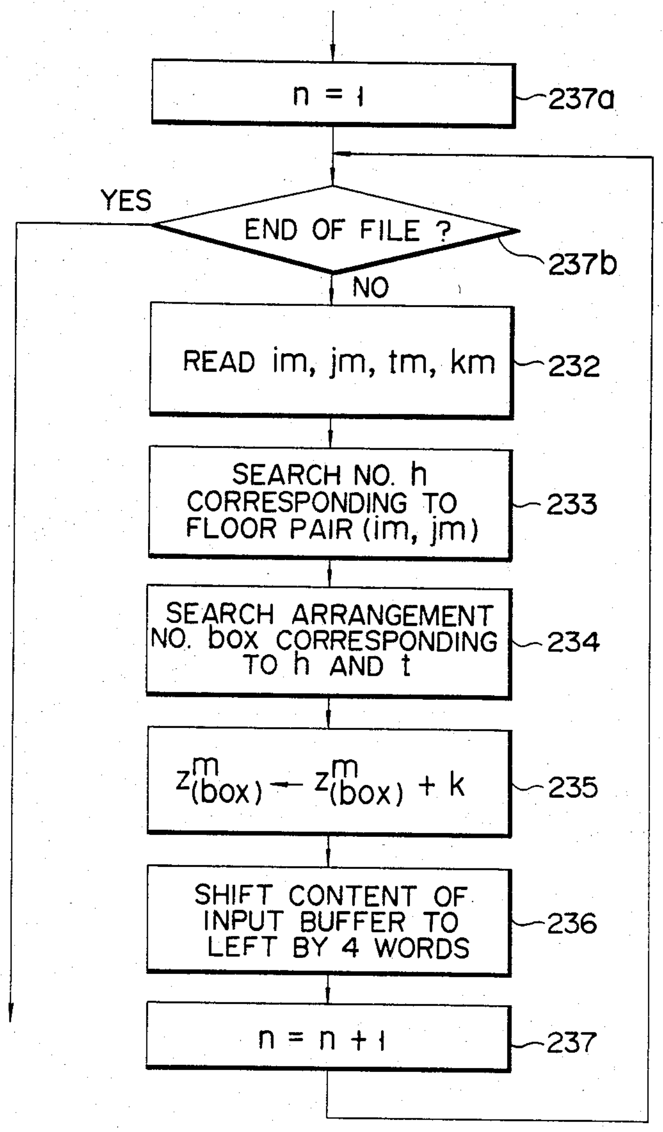

The data registration in subroutine 219 is performed by the routine shown in FIG. 28. In step 237*a*, the service floor number data n is set to "1". It is determined in step 237*b* whether or not the signal "END OF FILE (EOF)" is left in the input buffer. If NO in step 237*b*, the flow advances to step 232. In step 232, the computer 4 fetches the first four words $i_m$, $j_m$, $t_m$ and $k_m$ from the input buffer 4*c*. In step 233, the number h corresponding to the origin-destination floor pair ($i_m$, $j_m$) is searched. In step 234, an arrangement number box is searched for which indicates the data area portion of the data structure z which corresponds to the number h and the time $t^m$. Since the box searching process is rather complicated, it will be described later with reference to FIG. 29. In step 235, the transfer passenger number k is stored in the data area $z^m$(box) specified by the box. In step 236, the content of the input buffer 4*c* is shifted to the left by 4 words. The input buffer 4*c* is thus ready to receive new data. Thereafter, in step 237, n is incremented by "1", and the above operations are repeated. When all the data processes are completed, the END of FILE signal is left in the input buffer 4*c*.

Figure 29:
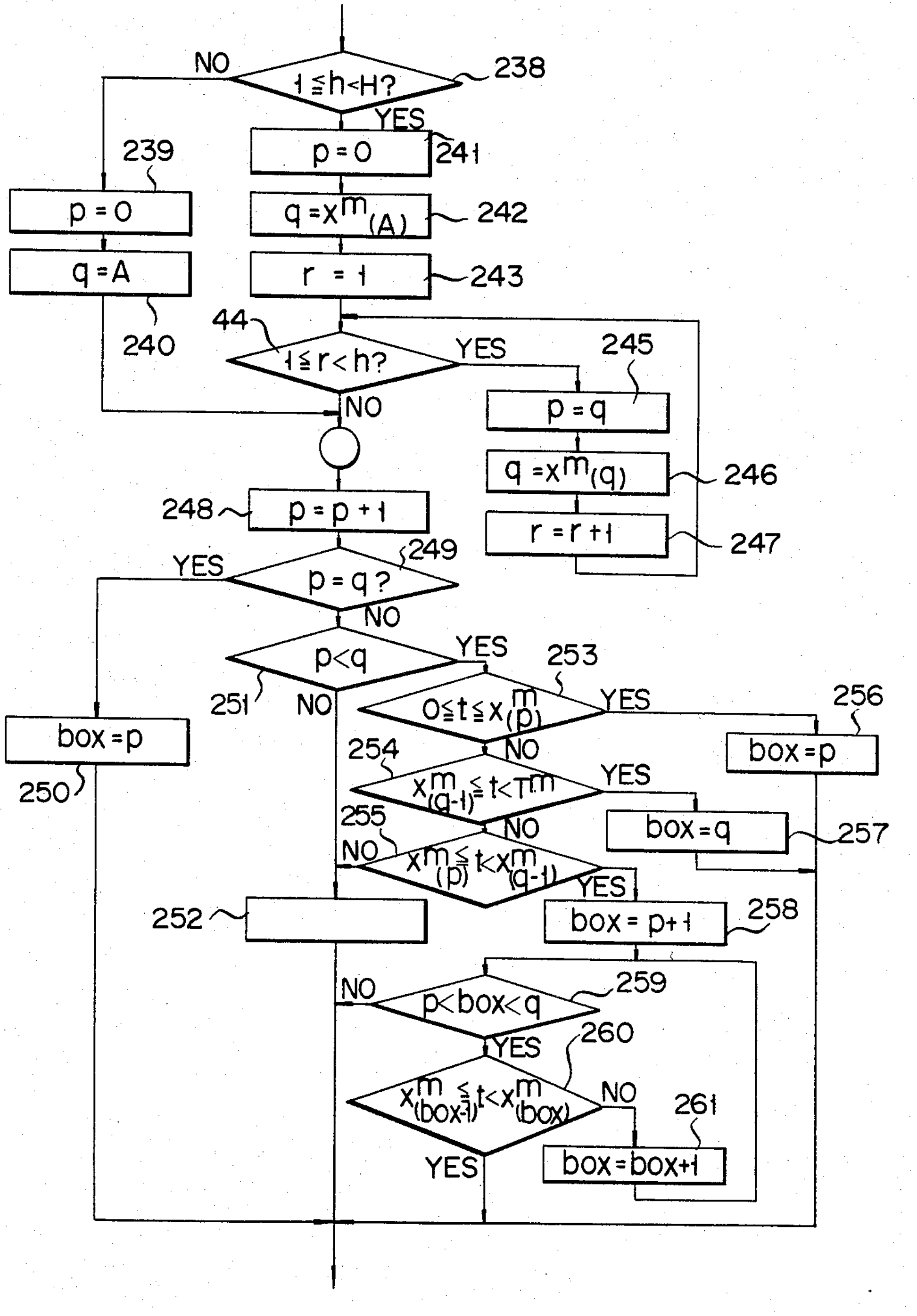
Figure 30:
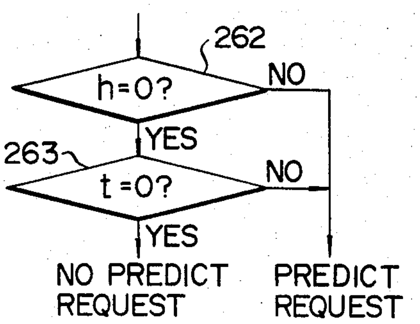

In the routine of FIG. 29, the box search is performed in the following manner. It is determined in step 238 whether or not the number h corresponds to an elevator car to be controlled. If NO in step 238, p and q are set to 0 and A, respectively, in steps 239 and 240. The next step is then executed. On the other hand, if YES in step 238, steps 241 to 247 are executed to trace the pointers shown in FIG. 21. The p, q and r are set to "0", "$x_{(A)}{}^m$" and "1", respectively, in steps 241, 242 and 243, thereby defining variables for searching for the data area corresponding to h. q is defined as a value representing the present position of pointer, p as the immediately preceding value of pointer position and r as a value representing how many times q is changed starting from the initial position $x_{(A)}{}^m$. In step 244, the value of r is examined, thereby actually executing the tracing of pointers. Until the number r reaches a maximum value corresponding to the number h, steps 245 to 247 are repeated. In steps 245 to 247, p is set to q and q is set to $x_{(q)}{}^m$. Thereafter, r is incremented by "1" to repeat the above operations, thereby tracing the pointers. When the above operation cycle is repeated h times, the data area portion corresponding to h is determined. Thereafter, in step 248, p is incremented by "1", thereby obtaining the start point p and the end point q of the data area portion. For example, if h=2 in the example shown in FIG. 25, p and q become 5 and 8, respectively.

Thereafter, it is determined in step 249 whether or not p equals q. If YES in step 249, the data area portion corresponding to the origin-destination floor pair h has only one word. In step 250, the value of the box is determined as p=q. However, if NO in step 249, it is then determined in step 251 whether or not p is smaller than q. If NO in step 251, an abnormal flag is set in step 252 to execute an appeal process.

If YES in step 251, the following conditions are sequentially checked in steps 253, 254 and 255. It is determined in step 253 whether or not the condition $0 \leqq t \leqq x_{(p)}{}^m$ is satisfied. If YES in step 253, it is determined in step 256 that the value of box is p. However, if NO in step 253, it is determined in step 254 whether or not the condition $x_{(q-1)}{}^m \leqq t < t^m$ is satisfied. If YES in step 254, it is determined in step 257 that the value of the box is q. However, if NO in step 254, it is then determined in step 255 whether or not the condition $x_{(p)}{}^m \leqq t < x_{(q-1)}{}^m$ is satisfied. If NO in step 255, it is determined to be abnormal, so that the abnormal flag is set in step 252.

However, if YES in step 255, the value of the box is initially set to (p+1) in step 258. It is then determined in steps 259 and 260 whether or not the conditions p<box<p and $x_{(box-1)}{}^m \leqq t < x_{(box)}{}^m$ are respectively satisfied. If YES in step 259 and NO in step 260, the value of the box is incremented by "1" in step 261. This operation is repeated to determine the value of the box. Thus, the box which contains data of the origin-destination floor pair h at time t, is searched for and determined. Subsequently, steps 235 and 236 shown in FIG. 28 follow.

The prediction request determination in step 220 shown in FIG. 26 is performed as follows. Data area is provided in the memory 4*a* of the computer 4 which stores the values of h and t. It is then determined in steps 262 and 263 whether or not h=0 and $t_m=0$. If YES in steps 262 and 263, it is determined that no prediction request has been made. If NO in step 262 or 263, it is determined that a prediction request has been made.

Figure 31:
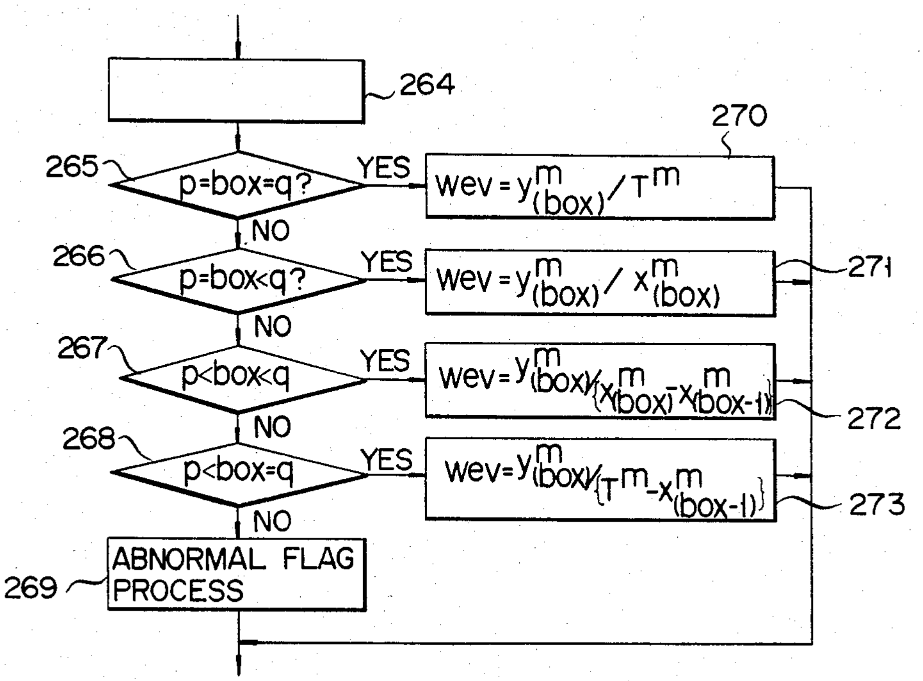

In subroutine 221 which is illustrated in detail in FIG. 31, in step 264, p, box, and q are fetched in the computer 4. In steps 265 to 268, the data p, box, and q are compared in a manner described later. If the conditions in steps 265 to 268 are not satisfied, the abnormal flag is set in step 269.

First, it is determined in step 265 whether or not the condition p=box=q is satisfied. If YES in step 265, a predicted or expected value $W_{ev}$ is computed in step 270 as follows:

$$Wev = y_{(box)}{}^m / T^m$$

This predicted value $W_{ev}$ indicates the average transfer passenger number per unit time at time t for the origin-destination floor pair h. However, if NO in step 265, it is determined in step 266 whether or not the condition p=box<q is satisfied. If YES in step 266, the predicted value is then computed in step 271 as follows:

$$W_{ev} = y_{(box)}{}^m / x_{(box)}{}^m$$

However, if NO in steps 265 and 266, it is then determined in step 267 whether or not the condition p<box<q is satisfied. If YES in step 267, the predicted value $W_{ev}$ is computed in step 272 as follows:

$$W_{ev} = y_{(box)}{}^m / \{x_{(box)}{}^m - x_{(box-1)}{}^m\}$$

Furthermore, if NO in step 267, it is determined in step 268 whether or not the condition p<box=q is satisfied. If YES in step 268, the predicted value $W_{ev}$ is computed in step 273 as follows:

$$W_{ev} = y_{(box)}{}^m / \{T^m - x_{(box-1)}{}^m\}$$

If none of the above conditions are satisfied, p, box, and q values are regarded to have values which cannot essentially occur in the present control routine. Therefore, this case is determined to be abnormal, thereby setting the abnormal flag in step 269.

It is noted that the data $x_{(box)}$ indicates time information. For example, the data $x_{(box)}$ indicates time information in units of seconds from the reference time 8 o'clock in the morning, which is set to be "0", to 8 o'clock in the next morning. In this example, relative time differences with respect to 8 o'clock in the morning are given at nine-thirty in the morning, one o'clock in the afternoon, and 6 o'clock in the evening. Therefore, the equations in steps 270 to 273 provide time periods (seconds) of the data m which correspond to the equation $W_{ev}$ ($=y_{(box)}{}^{m}$/box).

The data renewal or updating determination (step 222) and the data updating subroutine (step 223) in the routine shown in FIG. 26 will be described hereinafter. The determination of whether or not data updating is possible is performed by taking into account whether or not the previously mentioned conditions are satisfied. Assume that the traffic demand greatly decreases at night after a predetermined time, and that this condition continues for a few hours. Under this assumption by determining whether or not the present time passes predetermined reference time t0, it becomes possible to determine whether or not the data can be updated.

Figure 32:
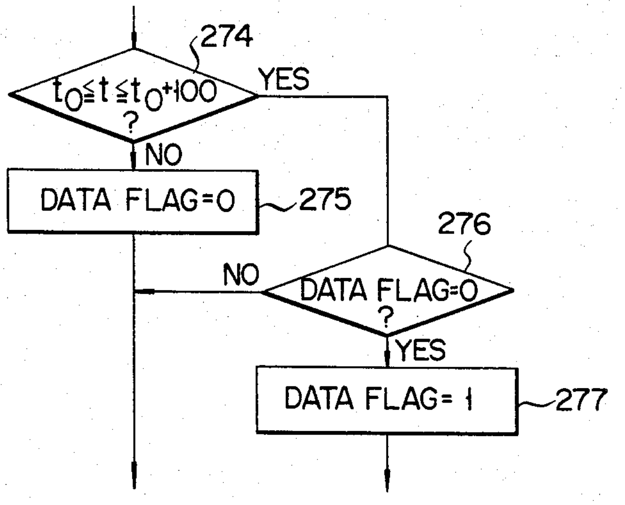

In this case, as shown in FIG. 32, it is determined in step 274 whether or not the present time falls within a range from the reference time t0 to (t0+100). The time period of 100 seconds to (t0+100) is set to allow execution of step 223 once within 100 seconds, thereby eliminating idle time due to repetition. If NO in step 275, the data flag is set to "0" so as not to allow updating. The next processing is then executed. However, if YES in step 274, it is then determined in step 176 whether or not the data flag is set to "0". If NO in step 276, the next processing is then executed. However, if YES in step 276, the data flag is set to "1" in step 277, thereby allowing updating once for the given time t.

Figure 33:
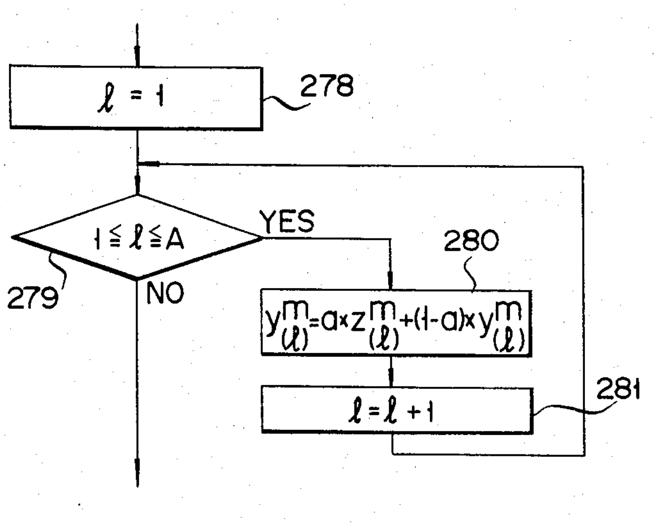

In step 223 to be executed by the above operation, data renewal or updating is performed by exponential smoothing of the data as shown in FIG. 33. In step 278, the data l is initially set to "1". It is then determined in step 279 whether or not the condition $1 \leqq l \leqq A$ is established. If YES in step 279, steps 280 and 281 are executed to renew the data. In step 280, a weighting coefficient of new data with respect to old data is given as a, so that the data renewal or updating is performed as follows:

$$Y_{(l)} = a \times z_{(l)} + (1-a) \times Y_{(l)}$$

$$\text{for } 0 \leqq a \leqq 1$$

When a=0, the new data is neglected. When a=1, the old data is neglected. The process is performed for given data l. Thereafter, the data l is incremented by "1" in step 281, thereby completing data renewal of y throughout the data area for l=1 to l=A.

Figure 36:
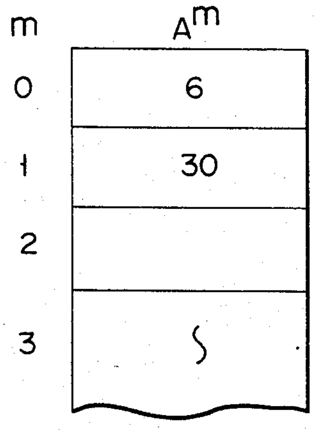
FIGS. 34 to 36 show modifications of this invention.
Figure 34:
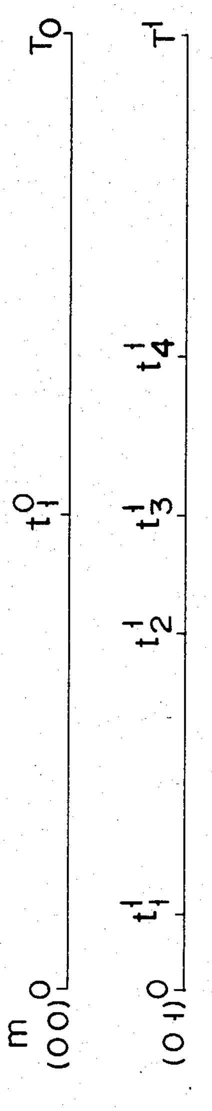
Figure 35:
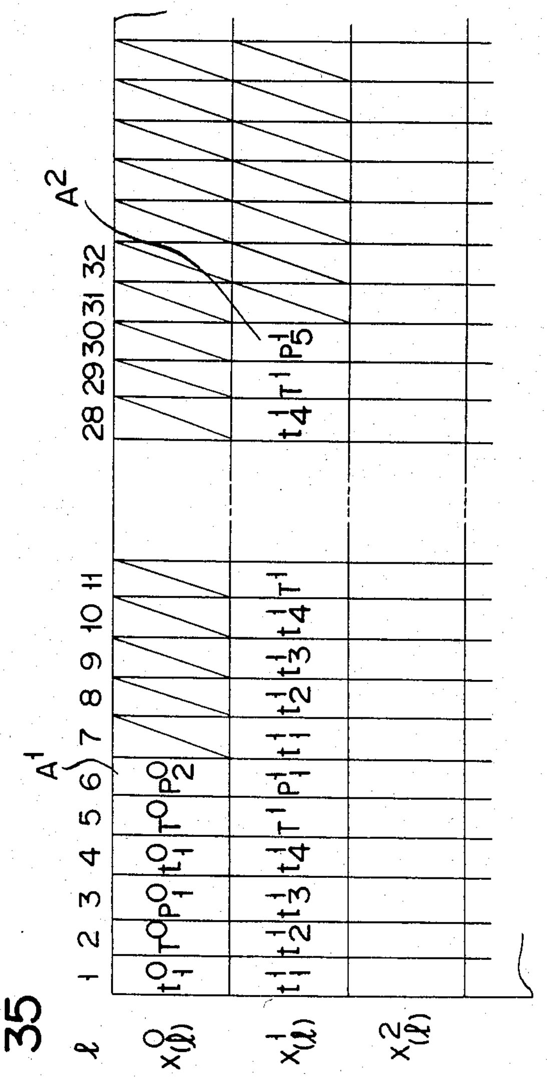

The recording system of the present invention is not limited to the system of the above embodiment. For example, day data m may be limited to two types of data such as weekday data and holiday data. In this case, Saturday may be handled as a weekday or a holiday according to the nature of building. Therefore, the data m may be limited to "0" and "1", thereby greatly decreasing the memory area used and the number of operation procedures. Furthermore, as shown in FIG. 34, the time periods for weekdays may differ from those for holidays. In this case, the data A is preferably increased or decreased in accordance with the value of the day data m. In practice in the above embodiment, the data A may be substituted by data $A^m$, and the corresponding routine may be executed. As shown in FIG. 35, the data arrays in the data areas $x_{(l)}{}^{m}$, $y^m$ and $z^m$ may be changed in accordance with the value of day data m. FIG. 36 shows a case of the data $A^m$ which corresponds to the value of day data m. In this case, a conversion table may be provided in the memory. According to the present invention, the next data position is specified by a pointer. so that the time ranges may be readily set in accordance with time conditions such as days of the week.

The traffic demand prediction system according to the present invention will be described hereinafter.

FIG. 34 shows a case of a change in passenger traffic demand with respect to time for a given origin-destination floor pair. In the elevator traffic demand a pattern is present which shows a given tendency with respect to time. For example, the elevator traffic demand increases at morning, luncheon period and evening. In general, traffic demand rarely occurs at night.

According to the system of the present invention, the interfloor passenger traffic is measured, and the average elevator traffic per unit time of the origin-destination floor pairs is updated by the measured traffic, thereby predicting derived car calls.

The data used in the traffic demand prediction is, as shown in a format shown in FIG. 35, 8-bit data wherein four most significant bits indicate an origin floor i and four least significant bits indicate a destination floor j. The number of passenger transferring across an origin-destination floor pair h of an origin floor i and a destination floor j is given by mh.

The memory 4*a* of the computer 4 has a data table shown in FIG. 36. The memory 4*a* stores the measured average traffic $m_{ij}$ of the origin-destination floor pair for a predetermined time period (e.g., 10 minutes). The memory 4*a* also has a table for storing control data y, $S_i$, f, $t_0$, $t_1$, $t_k$ and d, to be described later, as shown in FIG. 37.

Before the control sequence of the computer 4 is described, the principle of prediction of the derived car calls will be described.

Assume that the set of service floors of the elevator car is defined as F, and that average traffic from the origin floor i ($i \epsilon F$) to the destination floor j ($j \epsilon F$) per unit time is defined as $\lambda_{ij}$. The matrix of the average traffic $\lambda_{ij}$ with respect to the origin floor i and the destination floor j is defined as a demand matrix Λ. In a building which has a daily periodic traffic demand pattern, the traffic demand within a given time period is regarded as constant. Also assume that the travel direction of the elevator car is defined as d. An elevator hall H is represensed by a pair of a corresponding floor f ($f \epsilon F$) and the travel direction d as follows:

$$H = (f, d)$$

$$d \epsilon (\text{down, up}) \qquad (9)$$

Now assume that a hall call is made at the hall H at time $t_0$ and continues to time $t_1$ ($t_1 > t_0$). The passenger number x waiting for the elevator car at the hall H at time $t_1$ is predicted as follows.

The number of passengers who arrive at the hall H can be approximated by the Poisson process. The Poisson process allows the prediction that only one passenger arrived at the hall H at time $t_0$. The passengers who arrive in the hall H after the first passenger has arrived there can be considered independently of the first passenger. Therefore, if the number k of passengers arriving at a time interval from time $t_0$ to time $t_1$ is predicted, the waiting passenger number x can be predicted by adding one to the passenger number k. The occurrence rate $\lambda_i$ of hall calls at the hall H can be obtained in accordance with the reproducibility of the Poisson process as follows:

$$\lambda_i = \sum_{j<i} \lambda_{ij} (d = \text{down}) \tag{10a}$$

$$\lambda_i = \sum_{j>i} \lambda_{ij} (d = \text{up}) \tag{10b}$$

A maximum likelihood estimator $\hat{k}$ of the number k is given, when $\lfloor \alpha \rfloor$ is defined as a symbol which indicates an integer portion of $\alpha$, as follows:

$$\hat{k} = \lfloor \lambda_i (t_1 - t_0) \rfloor \tag{11}$$

Therefore, the waiting passenger number x can be predicted as follows:

$$\hat{x} = 1 + \lfloor \lambda_i (t_1 - t_0) \rfloor \tag{12}$$

The destination floors of the x waiting passengers at the hall H will be considered. The number $u_j$ of passengers who wish to go to the destination floor j is defined as follows:

$$\left.\begin{array}{l} j \geqq i \ldots u_j = 0 \\ j < i \ldots u_j = x\lambda_{ij}/\lambda_i \end{array}\right\} (d = \text{down}) \tag{13a}$$

$$\left.\begin{array}{l} j \leqq i \ldots u_j = 0 \\ j > i \ldots u_j = x\lambda_{ij}/\lambda_i \end{array}\right\} (d = \text{up}) \tag{13b}$$

The value $(\lambda_{ij}/\lambda_i)$ can be statistically collected by measuring the interfloor passenger traffic over a long period of time and indicates a distribution rate of x to $(j \in F)$. Then the passenger number $u_j$ to the floor j satisfies the following relation:

$$\Sigma u_j = x \tag{14}$$

If the number x is very large, the passengers who wish to go to the floor j can be regarded as $u_j$. In this case, the individual passengers are assumed to behave independently. This assumption is acceptable in practice. Now assume that a set of total non-negative integers is defined as $N_0$, and that a set of total real numbers is defined as R, the above principle has the equivalent meaning such that the relation:

$$u: F \ni j \rightarrow u_j \in R$$

is approximated by the following relation:

$$v: F \ni j \rightarrow v_i \in N_0$$

and this approximation can be achieved by satisfying the condition:

$$\Sigma v_j = x \tag{15}$$

using as an objective function:

$$\Sigma | u_j - v_j | \rightarrow \min$$

Then let $\lceil u_j \rceil$ be a minimum integer which is greater than the number $u_j$, the following equation is given from equations (14) and (15):

$$v_j = \lfloor u_j \rfloor \text{ or } \lceil u_j \rceil \tag{16}$$

Furthermore, if equations (17) and (18) are given as follows:

$$y = x - \sum_j u_j \tag{17}$$

$$W_j = u_j - u_j \tag{18}$$

the following inequality is given:

$$0 < W_j < 1$$

$$\text{for } v_j \in F \tag{19}$$

Using the following function:

$$z: F \ni j \rightarrow z_j \in \{0, 1\}$$

the following relations are given:

$$\Sigma z_i = y$$

$$\Sigma (z_j - W_j) \rightarrow \min \tag{20}$$

Elements F of the total service floor G are arranged in an order from the element which has a larger $W_j$ (i.e., y elements are obtained in an order from the element which has a smaller $(1 - W_j)$. If the vaIue z is defined by the following conditions, $$j \in G \ldots z_j = 1$$

$$j \notin G \ldots z_j = 0 \tag{21}$$

the solutions are obtained as follows:

$$j \in G \ldots v_j = 1 + \lfloor u_j \rfloor$$

$$j \notin G \ldots v_j = \lfloor u_j \rfloor \tag{22}$$

The above process is the proportional distribution of the waiting passenger number x and corresponds to the maximum likelihood estimation, thereby effectively predicting the derived car calls.

Figure 41:
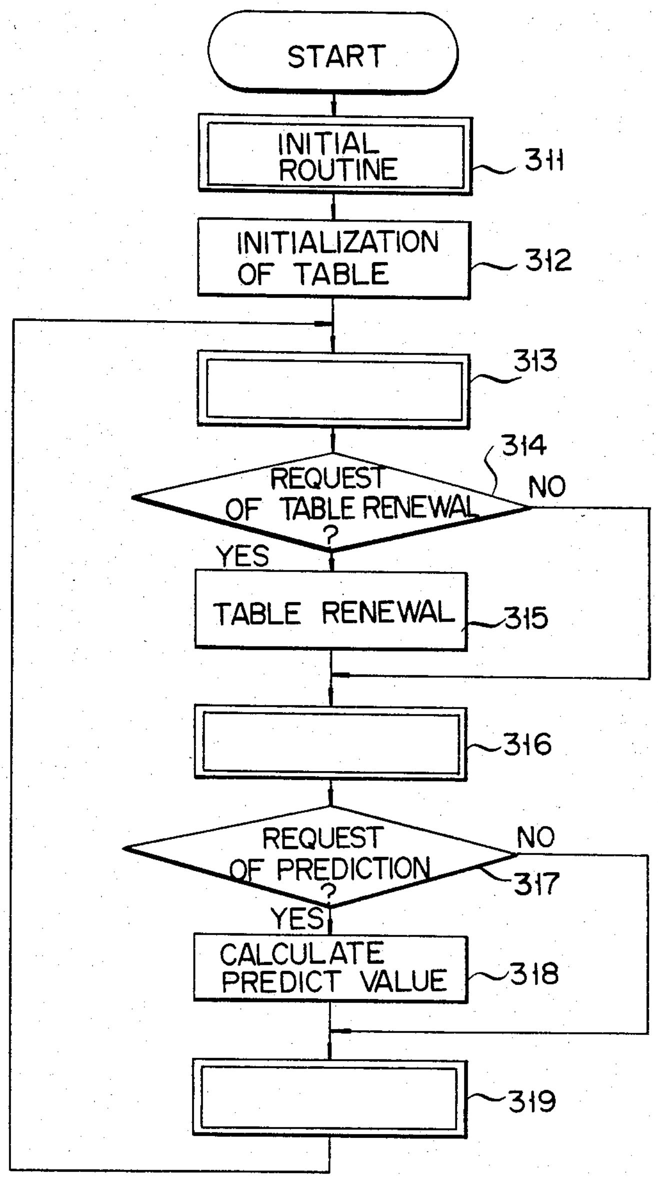
FIGS. 41 to 48 are flow charts for explaining traffic prediction.

The prediction process described above is performed by the computer 4 in the following manner. The computer 4 executes the control sequence as shown in FIG. 41 while performing operation control of the elevator cars. When the control program is started, in step 311, the existing initial routine is executed so as to perform various initial operations for controlling the operation of the elevator car. Thereafter, in step 312, the data tables shown in FIGS. 35 and 36 are initialized, thus completing the preparations for operation control of the elevator car and for prediction operation. In step 313, the first subroutine for elevator operation control is executed. It is then determined in step 314 whether or not the table renewal or updating is requested. If YES in step 314, the table renewal routine is executed in step 315. However, if NO in step 314, the flow jumps to the second subroutine for operation control, that is, to step 316. Thereafter, it is then determined in step 317 whether or not a prediction demand or request is made. If YES in step 317, the prediction computation (calculation) is performed in step 318. However, if NO in step 317, the flow jumps to step 319. The above series of operations are then repeated.

The above prediction process is incorporated, as a subroutine, in the main routine for controlling the elevator system as shown in FIG. 12.

Figure 42:
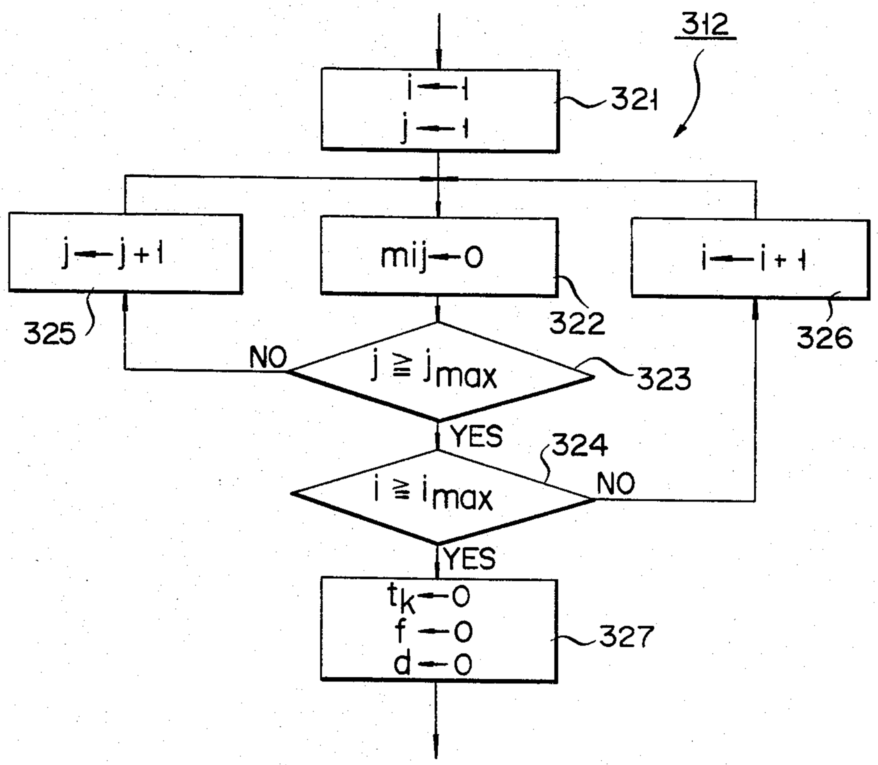

In step 312, the initialization routine will be executed as shown in FIG. 42. In step 321, the data i and j are set to "1", respectively. In step 322, the data $m_{ij}$ is set to "0". That is, in the data area (1, 1) in the table shown in FIG. 39 $m_i=0$ is set. This operation is repeated until the data i and j reach $i_{max}$ and $j_{max}$ respectively by steps 323 to 326. In each data area of the table shown in FIG. 39, the data $m_{ij}=0$ is sequentially stored in the respective data area, thereby clearing the entire data area of the table. Thereafter, in step 327, "0" is set in each of the data areas of the table shown in FIG. 40. It is noted that data $t_k$ shown in FIG. 40 shows a counter area to update or renew data in each cycle time $t_{k0}$, and that f and d are data areas for storing floor number data which is subject to a prediction computation and travel direction data, respectively. The updating of data $t_k$ in the data area is performed every 10 minutes taking $t_{k0}$ as 599.

Figure 43:
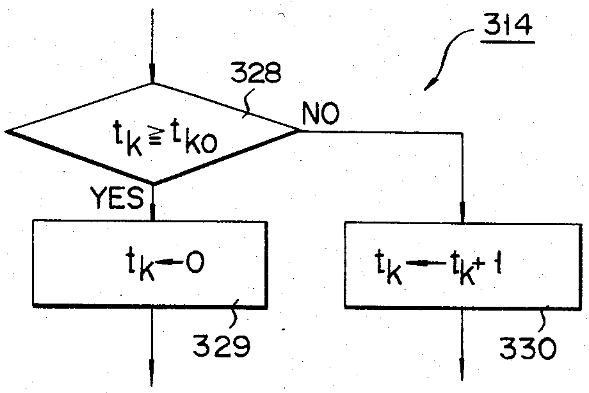

Step 314 of determining the table updating (renewal) request comprises steps as shown in FIG. 43. In step 328, the cycle count data $t_k$ is read out from the table shown in FIG. 43, and it is then determined whether or not the present cycle count data $t_k$ is equal to or greater than the maximum cycle count data $t_{k0}$. If YES in step 328, the data $t_k$ is reset to "0" in step 329 in which updating is then performed. However, if NO in step 328, the data $t_k$ is incremented by "1" in step 330, and the following step is executed.

Figure 44:
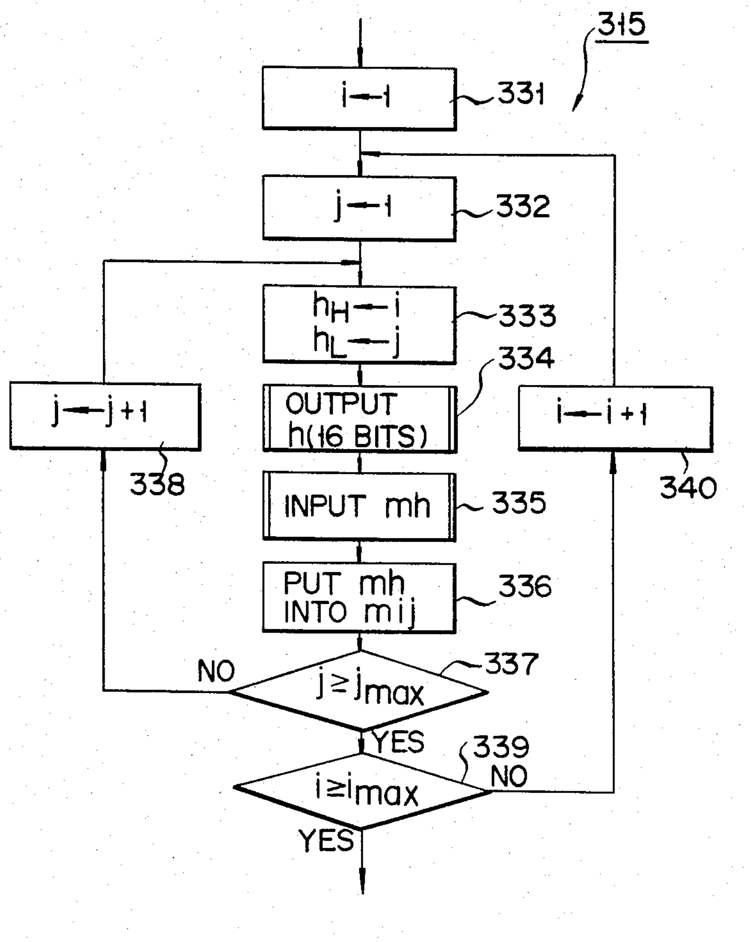

In response to the request the table updating process is executed in step 315 according to the flow shown in FIG. 44. In step 331, the data i is set to "1". In step 332, the data j is set to "1". Thereafter, in step 333 these data are respectively set as more significant 8-bit data $h_H$ and less significant 8-bit data $h_L$ in the 16-bit output data and are used as a prediction data request signal. The average traffic data $m_h$ is then computed in step 334 in response to the prediction data request signal. The data $m_h$ is stored as prediction data $m_{ij}$ in a data area (i, j) of the table. Thereafter, the data j is determined in step 337 and is incremented by "1" in step 338 so that steps 333 to 336 are repeated. After the data storage with respect to j from 1 to $j_{max}$ is completed, the data i is determined in step 340 and incremented by "1", thereby repeating steps 332 to 338. Prediction data $m_{ij}$ with respect to origin-destination floor (i, j) is sequentially stored in the entire data area of the table shown in FIG. 39. As previously described, the updating is performed every 600 cycles, i.e., every 10 minutes in response to the table renewal request.

Thereafter, the prediction request is then determined in step 317. In order to make a prediction request, a desired floor number is set as data f in the table shown in FIG. 40. At the same time, the direction data d is set to "0" (for up trip) or "1" (for down trip). The hall call time at the objective floor is set to $t_0$, and the predicted response time of the elevator car for the hall call is set to $t_1$. It is noted that the data $t_0$ and $t_1$ may be determined in units of seconds with respect to the reference time (e.g., midnight) as "0". Three bytes are sufficient for each of data areas. One byte is sufficient for each of data f and d and two bytes for data $t_k$. The response time $t_1$ can be obtained by adding the predicted arrival time to the present time. However, when no prediction request is made, the data f is preferably set to "0".

Figure 45:
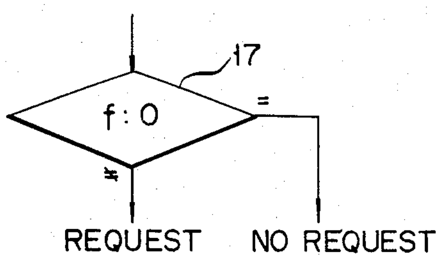

In step 317 shown in FIG. 45, it is determined whether or not the data f is "0" so as to determine the presence or absence of a prediction request.

Figure 46A:
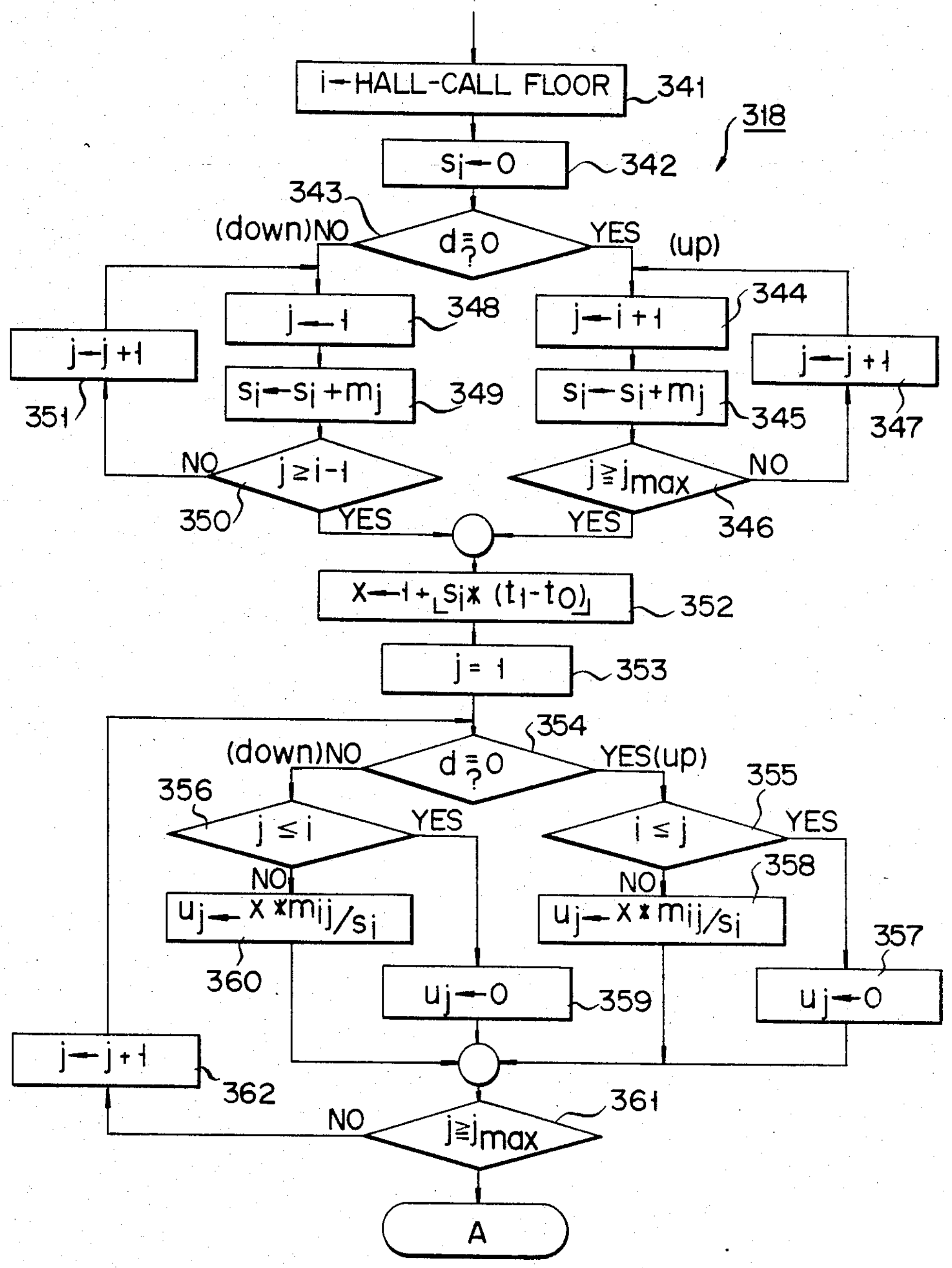
Figure 46B:
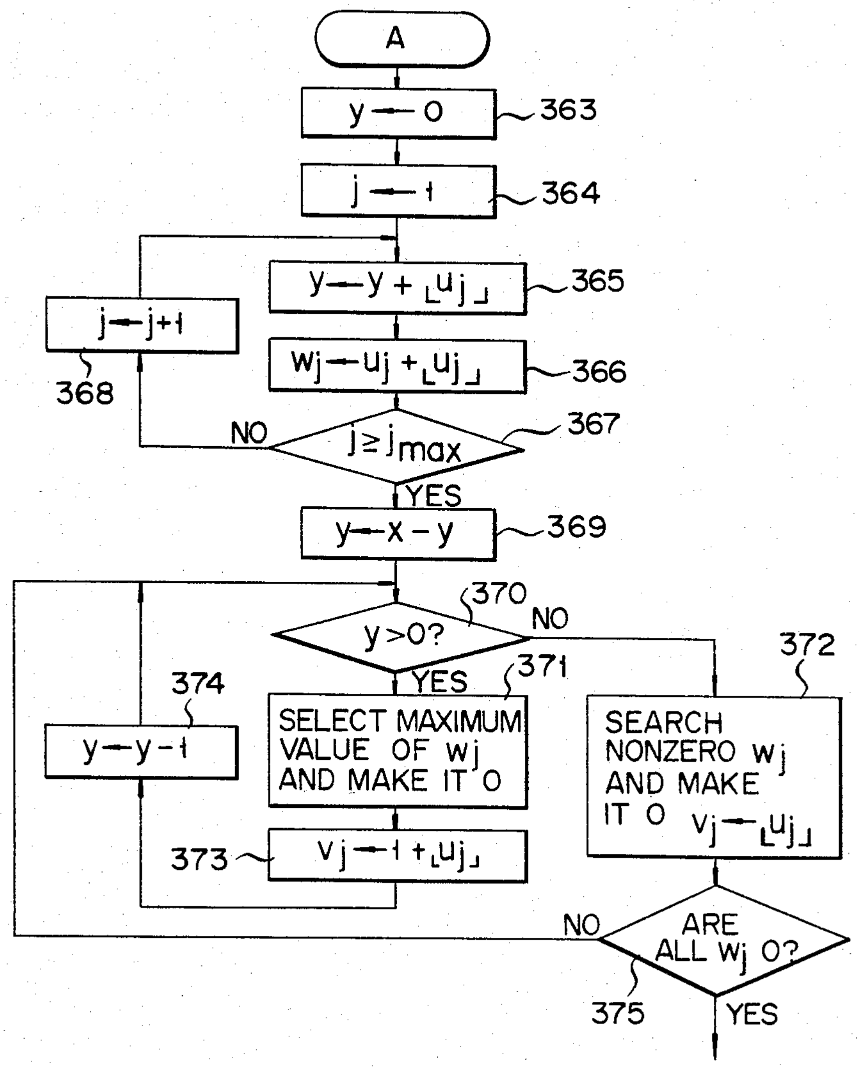

The prediction process of step 318 is then executed as shown in FIGS. 46*a* and 46*b*. The data f of the hall call floor is stored in step 341 as data of origin floor i for which the interfloor traffic is to be predicted. Thereafter, data address $S_i$ is cleared to "0" in step 342. It is then determined in step 343 whether the car travel direction is up or down from data d. If YES in step 343, that is, the car travels up, the data j is set to (i+1) in step 344. In step 345, the data $S_i$ is set to the value of the data $m_{ij}$ which is determined by the value of (i, j). The data set is achieved by rewriting $(S_i+m_{ij})$ into $S_i$. The data j is compared with $j_{max}$ in step 346 and the data j is incremented by "1" in step 347, until the data j reaches its maximum value $j_{max}$.

However, if NO in step 343, the data j is set to "1" in step 348. In step 349, the data $S_i$ is set to $(S_i+m_j)$ in the same manner as in step 345. These operations are repeated in accordance with the determination in step 350 and the incrementation of the data j in step 351 until the data j reaches (i−1). Therefore, either $$\sum_{j=i+1}^{j_{max}} m_{ij} \text{ or } \sum_{j=1}^{i-1} m_{ij}$$

is obtained in accordance with the car travel direction. The data of $S_i$ thus obtained corresponds to data $\lambda_i$ shown in equation (10).

Thereafter, in step 352, equation (12) is computed, on the basis of data $S_i$ obtained as described above, as follows:

$$x \leftarrow 1 + \lfloor S_i * (t_1 - t_0) \rfloor$$

Thus, the prospective waiting passenger number x is predicted. In step 353, the data j is set to "1". In step 354, it is determined again whether or not the travel direction data d is "0". If YES in step 354, it is determined in step 355 whether or not $i \leqq j$ is satisfied. However, if NO in step 354, it is determined whether or not $j \leqq i$ is satisfied. If YES in step 355, step 357 is executed. However if NO in step 355, step 358 is executed. Similarly, if YES in step 356, step 359 is executed. However, if NO in step 356, step 360 is executed. Thus, the data $u_j$ is computed. In step 357, the processing "$u_j \leftarrow 0$" is executed in the up trip mode under the condition $(i \leqq j)$. However, in the up trip mode under the condition $(i > j)$, step 358 is executed to achieve the operation:

$$u_j \leftarrow x * m_{ij}/S_i$$

In the down trip mode under the condition $(j \leqq i)$, step 359 executes the operation "$u_j \leftarrow 0$". However, in the down trip mode under the condition $(j > i)$, step 360 executes the following operation:

$$u_j \leftarrow x * m_{ij}/S_i$$

The above operations are repeated in accordance with the determination operation in step 361 and the incrementation of the value j in step 362, each data $u_j$ is obtained so as to correspond to each data j. Therefore, the number $u_j$ of passengers entering the car at the hall call floor is predicted for each destination floor.

Thereafter, referring to FIG. 46*b*, in step 363, the data y in the table is cleared to "0". In step 364, the data j is set to "1". The following operations are performed in steps 365 and 366, respectively:

$$y \leftarrow y + \lfloor u_j \rfloor$$

$$W_i \leftarrow u_j + \lfloor u_j \rfloor$$

The above series of operations are performed in accordance with the determination of the data j in step 367 and the incrementation of the data j in step 368 until the data j reaches its maximum data $j_{max}$. Finally, the following value is obtained:

$$y \leftarrow \sum_{j=1}^{j_{max}} \lfloor u_j \rfloor$$

In step 369, the following operation is performed:

$$y \leftarrow x - \sum_{j=1}^{j_{max}} \lfloor u_j \rfloor$$

This operation corresponds to the operations shown in equations (17) and (18).

These operations are performed by a simple subroutine wherein a floating-point process is used and only an integer portion is extracted.

Thereafter, it is then determined in step 370 whether or not the relation y=0 is satisfied. If YES in step 370, the flow advances to step 371. However, if NO in step 370, step 372 is executed. After step 371 is completed, the operation "$v_i \leftarrow 1 + u_j$" is performed in step 373, and then the data y is decremented in step 374, so that the flow returns to step 370. Meanwhile, if step 372 is executed, it is determined whether or not the data $W_i$ is "0" after step 372. The above series of operations are repeated until the data $W_i$ reaches "0".

The operation in step 371 is performed as follows when the condition j∈G shown in equation (22) is given:

$$v_j = 1 + \lfloor u_j \rfloor$$

Figure 47:
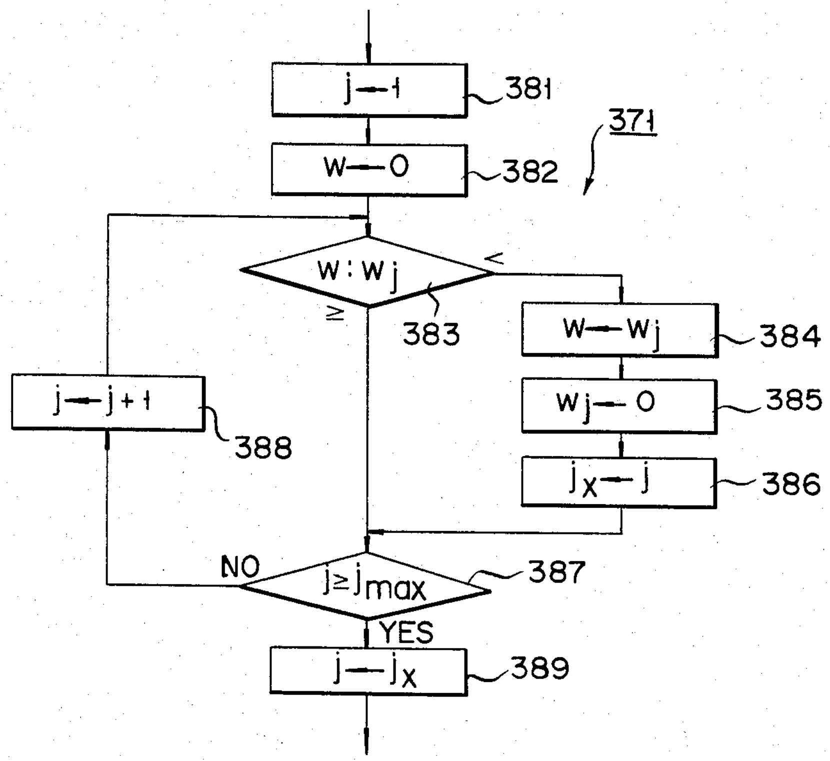

This operation is shown in FIG. 47. In steps 381 and 382, the data j are set to "1" and data W is set to "0", respectively. The data W is compared with the data $W_j$ in step 383. When $W < W_j$, the data W is set to $W_j$, the data $W_j$ to "0", and the data $j_x$ to j in steps 384, 385 and 386, respectively. However, when $W \geqq W_j$, the flow bypasses steps 384, 385 and 386, and goes to the determination of the data j in step 387 and the incrementation of the data j in step 388 until the data j reaches its maximum value $j_{max}$. When the data j reaches the maximum value $j_{max}$, the data j is set to $j_x$ thus obtained in step 389. Thus, step 371 is completed. As a result, in step 371, the operation is thus performed wherein the maximum value of the data $W_i$ is selected and this value is then set to "0".

Figure 48:
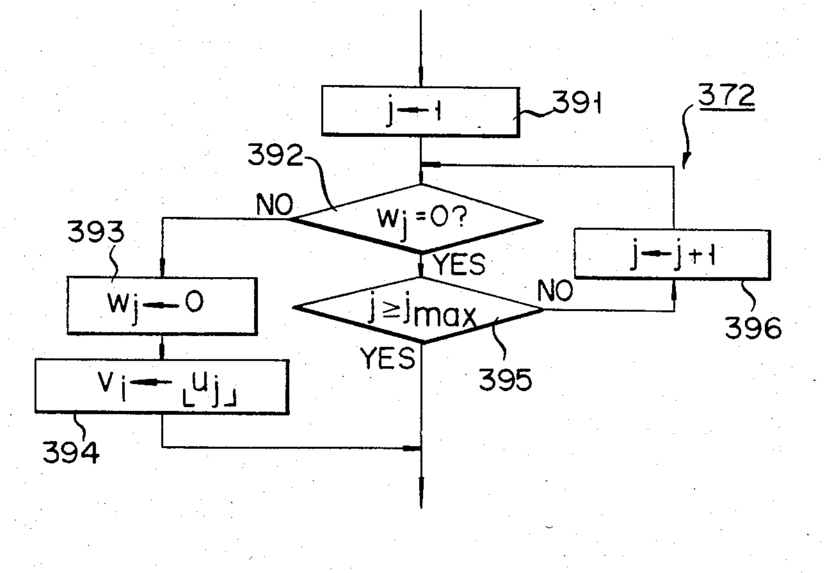

As shown in FIG. 48, in step 372, data $W_j$ which is not "0" searched to be set to "0" the process is achieved as follows:

$$v_i \leftarrow \lfloor u_j \rfloor$$

In step 391, the data j is set to "1". It is then determined in step 392 whether or not the data $W_j$ is "0". If NO in step 392, the data $W_j$ is set to "0" in step 393. Furthermore, in step 394, the integer portion of the data $u_j$ is set to $v_i$. However, if YES in step 392, in step 395 the value j is compared with the maximam value $j_{max}$. If NO in step 395, the data j is incremented by "1" and the flow returns to step 392. As a result, all the data $W_j$ are set to "0".

According to the processes by the computer 4, traffic demand is predicted for the condition that, when a hall call in the direction specified by d is made on the f-th floor at time to, the hall call will be responded at time $t_1$ in the matrix $v_j$ from 1 to $j_{max}$. In other words, the numbers of the waiting passengers for the respective destination floors can be predicted, thereby predicting the interfloor traffic.

The effects of the prediction system of the present invention can be summarized as follows:

(I) Special sensors need not be arranged at the respective elevator halls, and interfloor traffic data can be automatically obtained over a long period of time, so that the most probable destination floors of passengers can be predicted in accordance with the data.

(II) Since the previous interfloor traffic data is collected for each of time periods, the destination floors of the passengers can be accurately predicted.

(III) Furthermore, the arrival of passengers, the number of passengers and their destination floors can be predicted in accordance with a nonresponse time length.

(IV) Efficient group control of elevator cars can be performed in accordance with the above prediction results.

What we claim is:

1. A system comprising:

position detecting means for detecting a position of an elevator car;

passenger number detecting means for detecting an outgoing passenger number and an incoming passenger number at each of floors at which said elevator car stops;

car call registering means for registering car calls for destination floors which are made by incoming passengers at each of the floors at which said elevator car stops;

a clock device;

hall call registering means for registering a hall call at each service floor;

interfloor traffic measuring means responsive to said position detecting means, said passenger number detecting means, said car call registering means and said hall call registering means for distributing the number of passengers into origin-destination floor pairs by adding, with respect to each of the origin-destination floor pairs, the number of passengers whose origin-destination floor pair can be uniquely determined from the incoming number of passengers and the registered car calls, and the number of passengers whose origin-destination floor pair cannot be uniquely determined from the incoming or outgoing number of passengers and the registered car calls, which is estimated in accordance with empirical probability weights which are derived from previous traffic measurements;

recording means for recording measured interfloor traffic responsive to said interfloor measuring means and said clock device; and predicting means responsive to said interfloor traffic measuring means and said clock device for predicting average traffic per unit time for each of the origin-destination floor pairs, arrival time of said elevator car at a floor at which a hall call is registered, and destination floors of incoming passengers at the hall-call registered floor in accordance with the predicted arrival time of said elevator car and the predicted average traffic.

2. A system for measuring interfloor traffic of passengers utilizing an elevator car, comprising:

position detecting means for detecting a position of said elevator car;

passenger number detecting means for detecting an outgoing passenger number and an incoming passenger number at each of floors at which said elevator car stops;

car call registering means for registering car calls for destination floors which are made by incoming passengers at each of the floors at which said elevator car stops; and interfloor traffic measuring means responsive to said position detecting means, said passenger number detecting means and said car call registering means for distributing the number of passengers into origin-destination floor pairs by adding, with respect to each of the origin-destination floor pairs, the number of passenger whose origin-destination floor pair can be uniquely determined from the incoming number of passengers and the registered calls, and the number of passengers whose origin-destination floor pair cannot be uniquely determined from the incoming or outgoing number of passengers and the registered car calls, which is estimated in accordance with empirical probability weights which are derived from previous traffic measurements.

3. A system for recording interfloor traffic of passengers utilizing an elevator car comprising:

position detecting means for detecting a position of said elevator car;

passenger number detecting means for detecting an outgoing passenger number and an incoming passenger number at each of floors at which said elevator car stops;

car call registering means for registering car calls for destination floors which are made by incoming passengers at each of the floors at which said elevator car stops;

a clock device; and recording means, responsive to said position detecting means, said car call registering means, said passenger number detecting means, and said clock device, for measuring the interfloor traffic of passengers and for recording the measured interfloor traffic for each of origin-destination floor pairs and for each of predetermined time conditions.

4. A system according to claim 3 wherein the predetermined time conditions include the distinction of days of the week and the distinction of time periods in a day.

5. A system according to claim 3 wherein the predetermined time conditions include the distinction of a holiday and a weekday, and the distinction of time periods in each of the holiday and weekday.

6. A system according to claim 3 wherein the interfloor traffic is recorded for each of time periods determined by the time conditions after being weighed correspondingly to each of the time periods.

7. A system for predicting passenger traffic demand for an elevator car, comprising:

position detecting means for detecting a position of said elevator car;

passenger number detecting means for detecting an outgoing passenger number and an incoming passenger number at each of floors at which said elevator car stops;

car call registering means for registering car calls for destination floors which are made by incoming passengers at each of the floors at which said elevator car stops;

a clock device;

hall call registering means for registering a hall call at each service floor; and predicting means, responsive to said position detecting means, said passenger number detecting means, said car call registering means, said clock device, and said hall call registering means, for measuring traffic of passengers utilizing the elevator car between origin-destination floor pairs to predict an average traffic per unit time for each of the origin-destination floor pairs, for predicting arrival time of said elevator car at a floor at which a hall call is registered, and for predicting destination floors of incoming passengers at the hall-call registered floor in accordance with the predicted arrival time of said elevator car and the predicted average traffic.

8. A system according to claim 7 wherein the average traffic is obtained by adding a value obtained by weighing newly measured traffic of each of origin-destination floor pairs to previously measured traffic of the corresponding one of the origin-destination floor pairs.

9. A system according to claim 7 wherein, in addition to the destination floors of the incoming passengers at the hall call floor being predicted, the numbers of passengers to the destination floors are predicted.

10. A method of measuring interfloor traffic of passengers utilizing an elevator car, comprising the steps of:

detecting a position of said elevator car;

detecting an incoming passenger number and an outgoing passenger number at each of floors at which said elevator car stops;

registering car calls for destination floors specified by incoming passengers at each of the floors at which said elevator car stops;

registering a hall call at each service floor; and distributing the number of passengers into origin-destination floor pairs by adding, with respect to each of the origin-destination floor pairs, the number of passengers whose origin-destination floor pair can be uniquely determined from the incoming number of passengers and the registered car calls and the number of passengers whose origin-destination floor pair cannot be uniquely determined from the incoming or outgoing number of passengers and the registered car calls, which is estimated in accordance with empirical probability weights which are derived from previous traffic measurements.

11. A method of predicting passenger traffic demand for an elevator car, comprising the steps of:

detecting a position of said elevator car;

detecting an incoming passenger number and an outgoing passenger number at each of floors at which said elevator car stops;

registered car calls for destination floors specified by incoming passengers at each of the floors at which said elevator car stops;

measuring traffic of passengers utilizing the elevator car between origin-destination floor pairs in response to a detected position of said elevator car, detected passenger number, and registered car calls to predict an average traffic per unit time for each of the origin-destination floor pairs;

predicting arrival time of said elevator car at a floor at which a hall call is registered; and predicting destination floors of incoming passengers at the hall-call registered floor in accordance with the predicted arrival time and the predicted average traffic.

* * * * *

UNITED STATES PATENT AND TRADEMARK OFFICE
CERTIFICATE OF CORRECTION

PATENT NO. : 4,536,842

DATED : August 20, 1985

INVENTOR(S) : Yoneda, Kiyoshi, et al

It is certified that error appears in the above-identified patent and that said Letters Patent is hereby corrected as shown below: Title page:

--The inventor information on this Letters Patent is incorrect. Please omitt the following inventors from the Letters Patent:

Tetsuo YAMATANI, Toyoto HIJIYA, Hideo TAKEDA, Koji SHIBUYA and Kiichiro Tanaka --

Signed and Sealed this

*Fourteenth* Day of *January 1986*

[SEAL]

*Attest:*

DONALD J. QUIGG

*Attesting Officer* *Commissioner of Patents and Trademarks*